(12) United States Patent
Kakuko et al.

(10) Patent No.: US 10,706,272 B2
(45) Date of Patent: Jul. 7, 2020

(54) METHOD OF DETERMINING AN AMOUNT, NON-TRANSITORY COMPUTER-READABLE STORAGE MEDIUM AND INFORMATION PROCESSING APPARATUS

(71) Applicant: FUJITSU LIMITED, Kawasaki-shi, Kanagawa (JP)

(72) Inventors: Norihiro Kakuko, Kawasaki (JP); Shanshan Yu, Kawasaki (JP); Takeshi Otani, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 201 days.

(21) Appl. No.: 15/909,135

(22) Filed: Mar. 1, 2018

(65) Prior Publication Data
US 2018/0260619 A1    Sep. 13, 2018

(30) Foreign Application Priority Data
Mar. 9, 2017    (JP) .................................. 2017-045227

(51) Int. Cl.
*G06K 9/00*    (2006.01)
*G06T 7/246*    (2017.01)

(52) U.S. Cl.
CPC ..... *G06K 9/00335* (2013.01); *G06K 9/00261* (2013.01); *G06K 9/00281* (2013.01); *G06K 9/00315* (2013.01); *G06K 9/00604* (2013.01); *G06T 7/246* (2017.01); *G06T 2207/30201* (2013.01)

(58) Field of Classification Search
CPC .......... G06K 9/00335; G06K 9/00261; G06K 9/00281; G06K 9/00315
See application file for complete search history.

(56) References Cited

U.S. PATENT DOCUMENTS

| | | | |
|---|---|---|---|
| 2003/0117611 A1* | 6/2003 | Chon | G06T 7/20 356/5.01 |
| 2009/0226034 A1* | 9/2009 | Seki | G06T 7/246 382/103 |
| 2010/0225790 A1 | 9/2010 | Sasaki | |

(Continued)

FOREIGN PATENT DOCUMENTS

| | | |
|---|---|---|
| JP | 2008-301026 | 12/2008 |
| JP | 2009-130537 | 6/2009 |
| JP | 2010-268526 | 11/2010 |

*Primary Examiner* — Kim Y Vu
*Assistant Examiner* — Molly Delaney
(74) *Attorney, Agent, or Firm* — Staas & Halsey LLP

(57) ABSTRACT

A method includes extracting a plurality of feature points from a first image and a second image of an image-capture target, acquiring, from the second image, for each of the plurality of feature points in the first image, a set of points having a correlation with the feature point, identifying, for each of the plurality of feature points in the second image, a position of a center of gravity of the set of points, and determining an amount of movement of the image-capture target by performing weighting processing, the weighting processing being performed on each of amounts of displacements and a number of points in the set of points acquired for each of the plurality of feature points, each of the amounts of displacements being a displacement from a position of each of the plurality of feature points in the first image to the position of the center of gravity.

20 Claims, 22 Drawing Sheets

100

(56) References Cited

U.S. PATENT DOCUMENTS

2012/0129605 A1\* 5/2012 Livet ................. G06K 9/00355
 463/39
2017/0068853 A1\* 3/2017 Klement ............ G06K 9/00208
2017/0308998 A1\* 10/2017 Wang ........................ G06T 7/11
2019/0197321 A1\* 6/2019 Hughes .............. G06K 9/00362

\* cited by examiner

CORRELATING-POINT ACQUISITION PROCESSING $$\sum_{m=-M,\cdots,M,\ n=-N,\cdots,N} |G(t,x+m,y+n) - G(t+1,k+m,l+n)|$$
$$< \text{THRESHOLD VALUE } T_2$$

POSITION-OF-CENTER-OF-GRAVITY CALCULATION PROCESSING $$p = \frac{\sum_{(k,l)\in Q} k}{R}$$

$$q = \frac{\sum_{(k,l)\in Q} l}{R}$$

WEIGHTED AVERAGING PROCESSING $$u = \sum_{(x,y) \in p} (p-x) \times w(x,y)/W$$

$$v = \sum_{(x,y) \in p} (q-y) \times w(x,y)/W$$

WHERE $W = \sum_{(x,y) \in p} w(x,y)$

NOD DETECTION PROCESSING $i = $ TERMINATING TIME POINT $-$ STARTING TIME POINT $j = ((y_{left} - y_{min}) + (y_{right} - y_{min}))/2$

SERVING-QUALITY EVALUATION PROCESSING $|i_k - i_r|$ < THRESHOLD VALUE $T_8$ $|j_k - j_r|$ < THRESHOLD VALUE $T_8$ $C = k - r$ $H = 1/C$

METHOD OF DETERMINING AN AMOUNT, NON-TRANSITORY COMPUTER-READABLE STORAGE MEDIUM AND INFORMATION PROCESSING APPARATUS

CROSS-REFERENCE TO RELATED APPLICATION

This application is based upon and claims the benefit of priority of the prior Japanese Patent Application No. 2017-45227, filed on Mar. 9, 2017, the entire contents of which are incorporated herein by reference.

FIELD

The embodiments discussed herein are related to a method of determining an amount, a non-transitory computer-readable storage medium and an information processing apparatus.

BACKGROUND

There are amount-of-movement calculation methods of the related art in which an amount of movement of an object is calculated based on moving-image data acquired by capturing images of the object. For example, Japanese Laid-open Patent Publication No. 2009-130537 discloses a method of calculating an amount of movement of an object. In the disclosed method, a plurality of feature points of the object are extracted from a frame of moving-image data. Then, a destination of each of the plurality of feature points after movement in the next frame is identified, and an amount of displacement of each of the plurality of feature points is determined. The amount of movement of the object is obtained by calculating the average of the amounts of displacements of all the feature points.

In the method disclosed in Japanese Laid-open Patent Publication No. 2009-130537, a region that correlates well with a feature point in a current frame is acquired from the next frame, and a position of the center of gravity of the acquired region is identified as the destination of the feature point after movement. Thus, an amount of movement is calculated even if the next frame is a blurred image as a result of the movement of the object. As a related-art technical document, Japanese Laid-open Patent Publication No. 2009-130537 is disclosed.

SUMMARY

According to an aspect of the invention, a method includes extracting a plurality of feature points from a first image of an image-capture target, acquiring, for each of the plurality of feature points included in the first image, a set of points having a correlation with the feature point from a second image being captured after the first image, the correlation meeting a first condition, identifying, for each of the plurality of feature points included in the second image, a position of a center of gravity of the acquired set of points, determining an amount of movement of the image-capture target by performing weighting processing, the weighting processing being performed on each of amounts of displacements and a number of points included in the set of points acquired for each of the plurality of feature points, each of the amounts of displacements being a displacement from a position of each of the plurality of feature points in the first image to the position of the center of gravity of the set of points in the second image, and outputting the determined amount of movement.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

If feature points extracted from a current frame are close to each other, blurred portions around the feature points close to each other in the next frame may overlap. In such a case, in the calculation method described above, it is difficult to acquire regions that correlate well with the adjacent feature points from the next frame, and it is difficult to identify destinations of the feature points in the next frame accurately. As a result, the accuracy of calculating the amount of movement of an object decreases.

Hereinafter, embodiments will be described with reference to the accompanying drawings. In the specification and the drawings, elements having substantially identical functions and configurations are referred to by the same reference signs, and duplicate descriptions thereof will be omitted.

First Embodiment

<System Configuration of Amount-of-Movement Calculation System>

Figure 1:
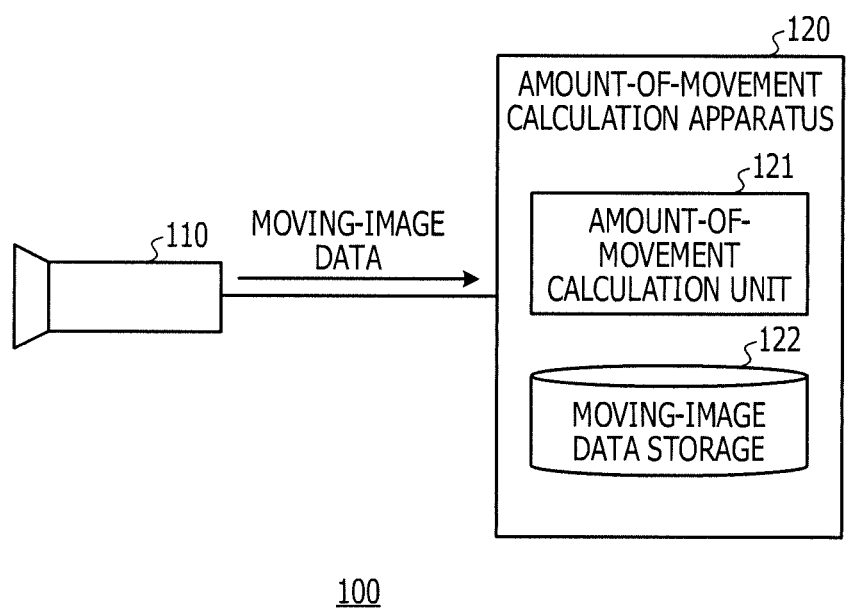
FIG. 1 depicts an example system configuration of an amount-of-movement calculation system including an amount-of-movement calculation apparatus according to a first embodiment.

First, a system configuration of an amount-of-movement calculation system including an amount-of-movement calculation apparatus according to a first embodiment will be described. FIG. 1 depicts an example system configuration of the amount-of-movement calculation system including the amount-of-movement calculation apparatus according to the first embodiment.

As depicted in FIG. 1, an amount-of-movement calculation system 100 includes an image capturing apparatus 110 and an amount-of-movement calculation apparatus 120. The image capturing apparatus 110 and the amount-of-movement calculation apparatus 120 is coupled to each other via a predetermined interface.

The image capturing apparatus 110 captures at a predetermined frame rate a moving image of an image-capture-target object and transmits the moving-image data acquired by capturing to the amount-of-movement calculation apparatus 120.

The amount-of-movement calculation apparatus 120 includes a moving-image data storage 122 and stores the moving-image data transmitted from the image capturing apparatus 110. An amount-of-movement calculation program is installed in the amount-of-movement calculation apparatus 120, and the amount-of-movement calculation apparatus 120 functions as an amount-of-movement calculation unit 121 by executing the amount-of-movement calculation program.

The amount-of-movement calculation unit 121 extracts a plurality of feature points of the image-capture-target object from each frame of the moving-image data stored in the moving-image data storage 122 and calculates an amount of movement of the image-capture-target object by identifying the destination, in the next frame, of each of the plurality of the extracted feature points.

<Hardware Configuration of Amount of Movement Calculation Apparatus>

Figure 2:
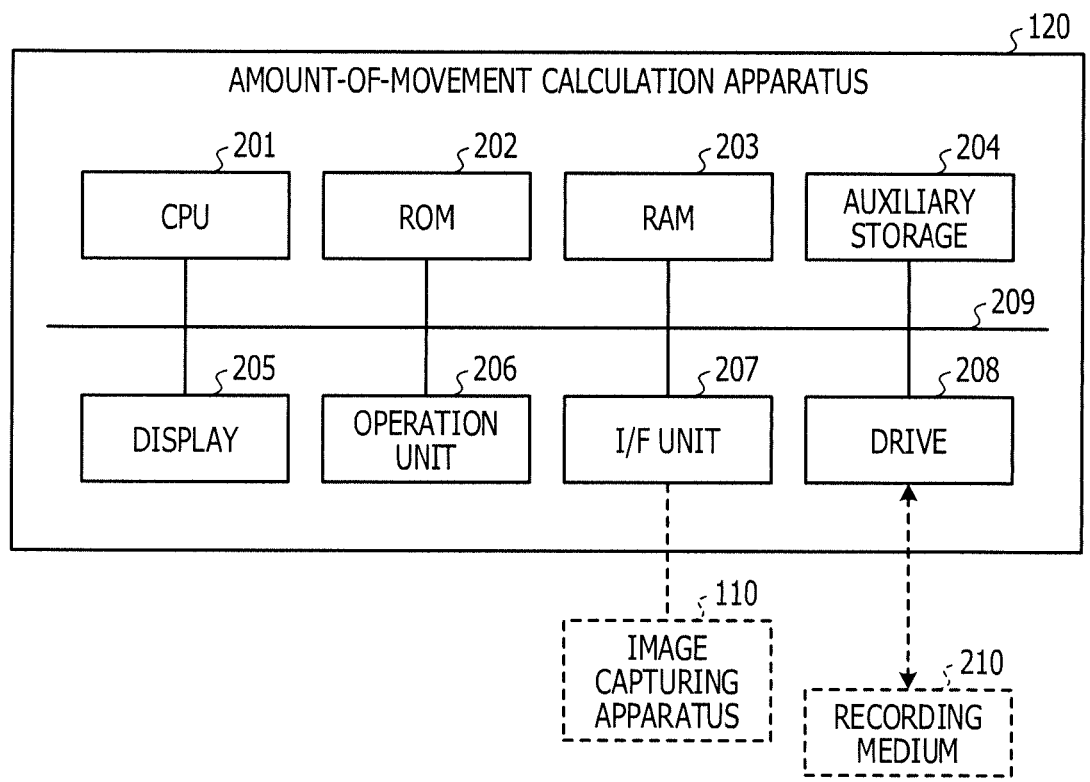
FIG. 2 depicts an example hardware configuration of the amount-of-movement calculation apparatus.

Next, a hardware configuration of the amount-of-movement calculation apparatus 120 will be described. FIG. 2 depicts an example hardware configuration of the amount-of-movement calculation apparatus. As depicted in FIG. 2, the amount-of-movement calculation apparatus 120 includes a central processing unit (CPU) 201, a read-only memory (ROM) 202, and a random-access memory (RAM) 203. The CPU 201, the ROM 202, and the RAM 203 constitute a computer.

The amount-of-movement calculation apparatus 120 also includes an auxiliary storage 204, a display 205, an operation unit 206, an interface (I/F) unit 207, and a drive 208. The units of the amount-of-movement calculation apparatus 120 are coupled to each other via a bus 209.

The CPU 201 is a device configured to execute various programs (for example, the amount-of-movement calculation program) that are installed in the auxiliary storage 204.

The ROM 202 is a nonvolatile memory. The ROM 202 functions as the main storage device to store various programs and data that are used to cause the CPU 201 to execute various programs installed in the auxiliary storage 204. Specifically, the ROM 202 stores a boot program and the like such as a basic input/output system (BIOS) and an extensible firmware interface (EFI).

The RAM 203 is a volatile memory such as a dynamic random access memory (DRAM) or a static random access memory (SRAM). The RAM 203 functions as the main storage device to provide a work area to which the various programs are loaded when the various programs installed in the auxiliary storage 204 are executed by the CPU 201.

The auxiliary storage 204 is an auxiliary storage device configured to store various programs, information generated when the various programs are executed, and information used when the various programs are executed. The moving-image data storage 122 is realized in the auxiliary storage 204.

The display 205 is a display device configured to display an internal state or the like of the amount-of-movement calculation apparatus 120. The operation unit 206 is an input device through which a user of the amount-of-movement calculation apparatus 120 inputs various instructions to the amount-of-movement calculation apparatus 120. The I/F unit 207 is a coupling device configured to couple the amount-of-movement calculation apparatus 120 to the image capturing apparatus 110.

The drive 208 is a device into which a recording medium 210 is set. Examples of the recording medium 210 mentioned here include media that store information optically, electrically, or magnetically, for example, a CD-ROM, a flexible disk, and a magneto-optical disk. Examples of the recording medium 210 may also include a semiconductor memory, such as a ROM or a flash memory, which records information electrically.

For example, the recording medium 210 that is distributed is set into the drive 208, and various programs recorded to the recording medium 210 is read by the drive 208. Then the various programs are installed and stored in the auxiliary storage 204.

<Outline of Amount-of-Movement Calculation Processing>

Next, an outline of amount-of-movement calculation processing performed by the amount-of-movement calculation unit 121 will be described with reference to a comparative example.

(1) Comparative Example of Amount-of-Movement Calculation Processing

Figure 3:
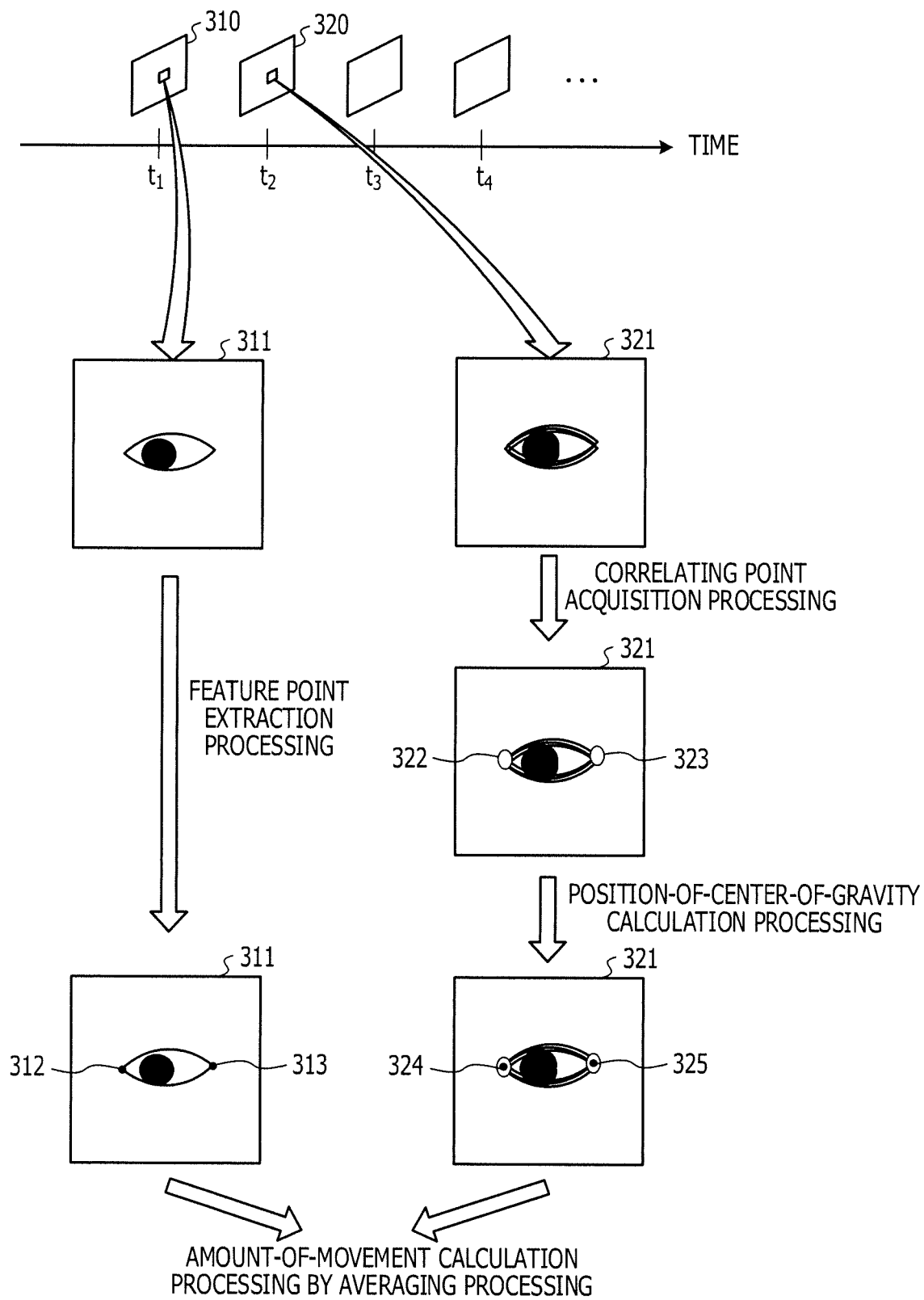
FIG. 3 depicts a comparative example of amount-of-movement calculation processing.

First, an outline of a comparative example of the amount-of-movement calculation processing will be described. FIG. 3 depicts the comparative example of amount-of-movement calculation processing. As depicted in FIG. 3, in the comparative example of the amount-of-movement calculation processing, feature points of an image-capture-target object are extracted from each frame (for example, a frame 310 and a frame 320) included in moving-image data. Here, a description will be provided on the assumption that the image-capture-target object is a face of a person and that edge portions of an eye of the person are extracted as the feature points.

As depicted in FIG. 3, suppose that a region 311 including the eye of the person is extracted from the frame 310 captured at a time point $t_1$, and feature points 312 and 313 are extracted by performing feature-point extraction processing.

Also suppose that a region 321 including the eye of the person is extracted from the frame 320 captured at a time point $t_2$. In the frame 320 at the time point $t_2$, the image included in the region 321 is a blurred image because the person who is the image-capture target has moved their face.

In the comparative example of the amount-of-movement calculation processing, a set of points (correlating points) that correlate well with the feature point 312 and a set of points (correlating points) that correlate well with the feature point 313 are acquired when destinations of the feature points 312 and 313 are identified in the region 321. Thus, sets of correlating points 322 and 323 are acquired from the region 321.

Subsequently, in the comparative example of the amount-of-movement calculation process, the position of the center of gravity of each of the sets of correlating points 322 and 323 is calculated. The positions of the centers of gravity of the sets of correlating points 322 and 323 are identified as the destination 324 of the feature point 312 and the destination 325 of the feature point 313, respectively.

Further, in the comparative example of the amount-of-movement calculation processing, the average of an amount of displacement of the feature point 312 to the destination 324 and an amount of displacement of the feature point 313 to the destination 325 is calculated and output as the amount of face movement of the person, who is an image-capture target.

(2) Specific Example of Amount-of-Movement Calculation Processing Performed by Amount-of-Movement Calculation Unit 121

Figure 4:
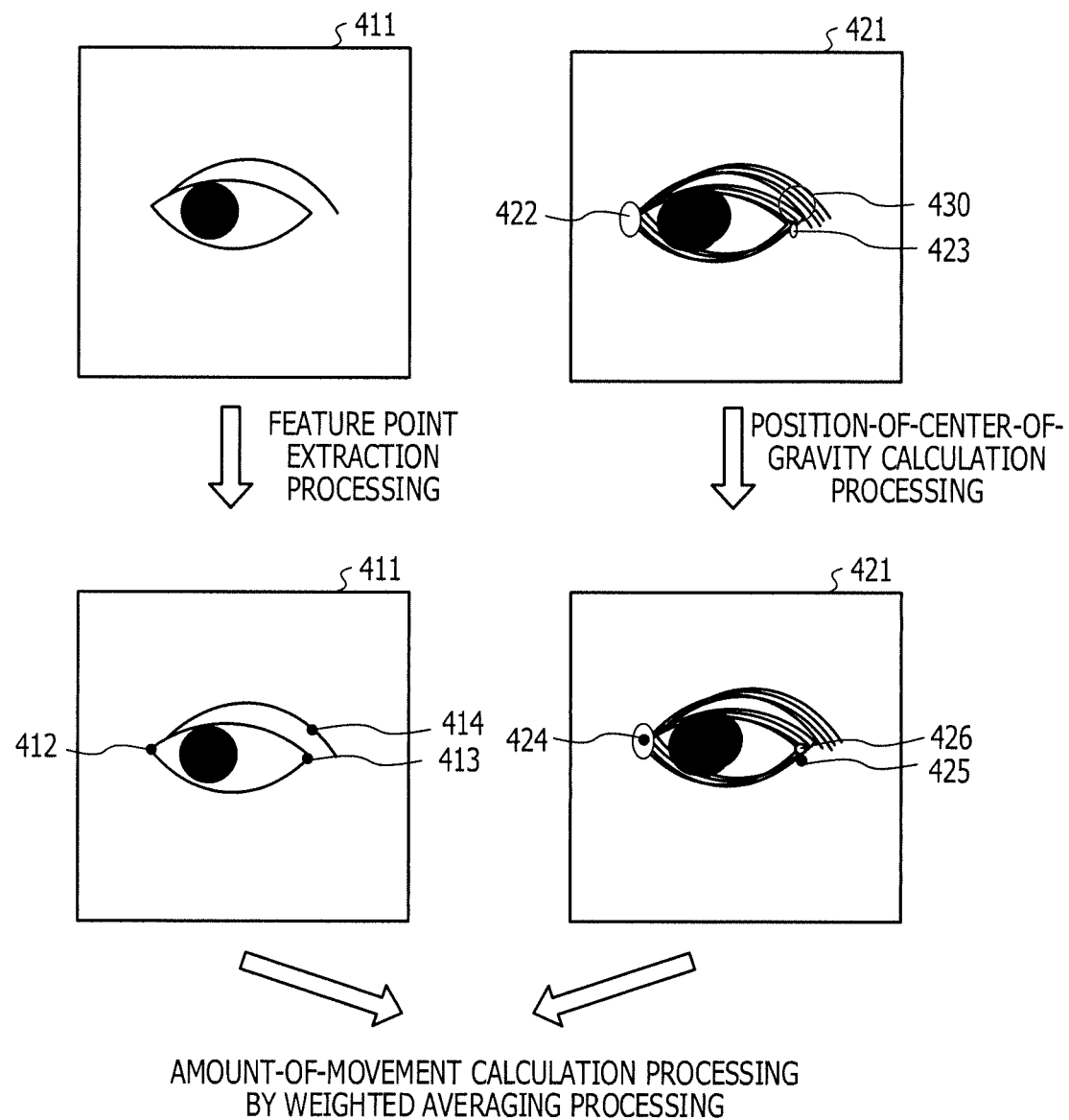
FIG. 4 depicts a specific example of amount-of-movement calculation processing.

Next, a specific example of amount-of-movement calculation processing performed by the amount-of-movement calculation unit 121 of the amount-of-movement calculation apparatus 120 according to the first embodiment will be described. FIG. 4 depicts a specific example of the amount of movement calculation processing.

If an eye of a person who is an image-capture target has a shape depicted in a region 411 in FIG. 4, a feature point 414 is extracted at a position close to a feature point 413 after feature-point extraction processing is performed.

In such a case, if the person who is the image-capture target moves their face, blurred portions around the feature points close to each other (feature point 413 and feature point 414) overlap (refer to region 430 enclosed by circle) as depicted in a region 421. As a result, of sets of correlating points 422 and 423 acquired by performing correlating-point acquisition processing, the set of correlating points 423 has a very small number of correlating points compared with a case where blurred portions do not overlap (the set of correlating points 323 in FIG. 3).

Further, of destinations 424 and 425 that are identified by performing position-of-center-of-gravity calculation processing, the destination 425 (destination with a smaller number of correlating points) is located at a position that shifts from a destination 426, which is the correct destination.

Thus, the amount-of-movement calculation unit 121 calculates an amount of face movement of the person who is the image-capture target in such a way that the effect of the destination 425, which is located at the position that shifts from the correct destination 426, is reduced. Specifically, weighted averaging processing is performed for an amount of displacement of a feature point 412 to the destination 424 and an amount of displacement of the feature point 413 to the destination 425, and the amount of face movement of the person who is the image-capture target is calculated.

When the weighted averaging processing is performed, the amount-of-movement calculation unit 121 makes a weight by which the amount of displacement of the feature point 413 to the destination 425 is multiplied smaller than a weight by which the amount of displacement of the feature point 412 to the destination 424 is multiplied.

Thus, when destinations of feature points are not correctly identified because of overlapping blurred portions, the amount-of-movement calculation unit 121 calculates the amount of movement so as to reduce the effect of the blurred portions. Consequently, by using the amount-of-movement calculation unit 121, the accuracy of calculating the amount of movement is improved compared with the amount-of-movement calculation processing in the comparative example.

<Details of Functional Configuration of Amount-of-Movement Calculation Unit>

Figure 5:
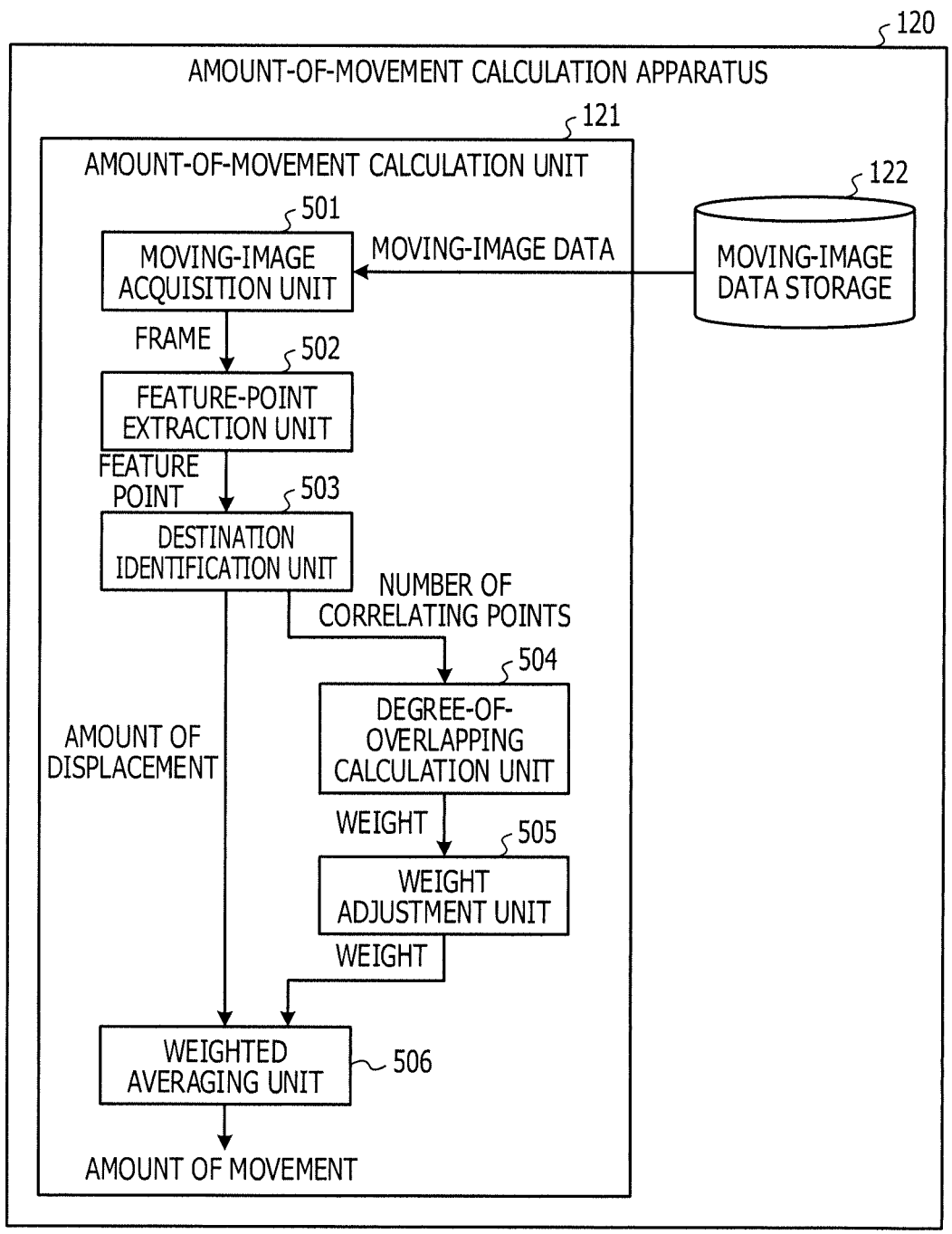
FIG. 5 depicts details of a functional configuration of an amount-of-movement calculation unit.

Next, details of a functional configuration of the amount-of-movement calculation unit 121 will be described. FIG. 5 depicts details of the functional configuration of the amount-of-movement calculation unit.

As depicted in FIG. 5, the amount-of-movement calculation unit 121 includes a moving-image acquisition unit 501, a feature-point extraction unit 502, a destination identification unit 503, a degree-of-overlapping calculation unit 504, a weight adjustment unit 505, and a weighted averaging unit 506.

The moving-image acquisition unit 501 reads moving-image data from the moving-image data storage 122 and transfers the moving-image data to the feature-point extraction unit 502 frame by frame.

The feature-point extraction unit 502 extracts feature points from each frame of the moving-image data transferred from the moving-image acquisition unit 501 and informs the destination identification unit 503 of the feature points.

The destination identification unit 503 acquires, from a frame immediately following a frame to be processed, a set of correlating points whose correlation with one of the feature points extracted from the frame to be processed meets a predetermined condition and identifies the position of the center of gravity of the acquired correlating points as the destination of the feature point extracted from the frame to be processed. The destination identification unit 503 identifies, in the frame immediately following the frame to be processed, the destinations of all the feature points of which the destination identification unit 503 has been informed by the feature-point extraction unit 502.

The destination identification unit 503 informs the weighted averaging unit 506 of an amount of displacement of each of the feature points to the destination (that is, an amount of displacement of each of the feature points), the feature points being extracted from the frame to be processed.

In addition, for each of the feature points, the destination identification unit 503 informs the degree-of-overlapping calculation unit 504 of the number of the correlating points that are acquired when the destinations are identified.

The degree-of-overlapping calculation unit 504 calculates degrees of overlapping of blurred portions in accordance with the number of correlating points received from the destination identification unit 503. The degree-of-overlapping calculation unit 504 also calculates a weight for each of the feature points in accordance with the calculated degrees of overlapping. The degree-of-overlapping calculation unit 504 informs the weight adjustment unit 505 of the calculated weights in association with the feature points.

The weight adjustment unit 505 statistically processes the weights received from the degree-of-overlapping calculation unit 504 and adjusts the weights to be used by the weighted averaging unit 506 for weighted averaging processing. The weight adjustment unit 505 informs the weighted averaging unit 506 of the adjusted weights in association with the feature points.

The weighted averaging unit 506 performs weighted averaging processing by multiplying the amount of displacement of each of the feature points received from the destination identification unit 503 by the weight received from the weight adjustment unit 505 and outputs the amount of face movement of the person who is the image-capture target.

<Processing Performed by Each Unit Included in Amount-of-Movement Calculation Unit>

Next, details of processing performed by each unit included in the amount-of-movement calculation unit 121 (the feature-point extraction unit 502, the destination identification unit 503, the degree-of-overlapping calculation unit 504, the weight adjustment unit 505, and the weighted averaging unit 506) will be described.

(1) Details of Processing Performed by Feature-Point Extraction Unit 502

Figure 6:
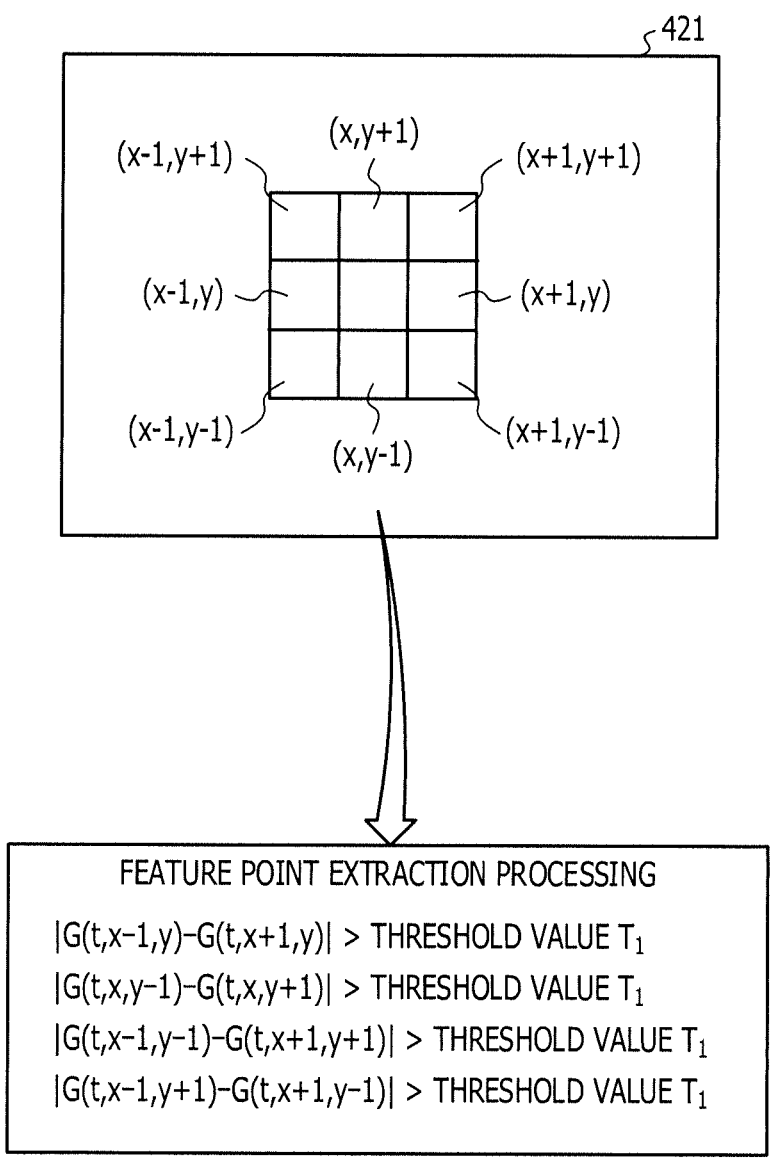
FIG. 6 depicts a specific example of feature point extraction processing performed by a feature point extraction unit.

FIG. 6 depicts a specific example of feature-point extraction processing performed by the feature-point extraction unit. As depicted in FIG. 6, if it is assumed that a pixel (coordinates expressed as (x, y)) included in the region 421 has a pixel value $G(t, x, y)$, the feature-point extraction unit 502 extracts pixels that meet the conditions specified by the following expressions as feature points. Here, t denotes the time point when the frame that includes the region 421 is captured.

$$|G(t,x-1,y)-G(t,x+1,y)|>\text{threshold } T_1$$

$$|G(t,x,y-1)-G(t,x,y+1)|>\text{threshold } T_1$$

$$|G(t,x-1,y-1)-G(t,x+1,y+1)|>\text{threshold } T_1$$

$$|G(t,x-1,y+1)-G(t,x+1,y-1)|>\text{threshold } T_1 \quad \text{[Math 1]}$$

In other words, the feature-point extraction unit 502 extracts as a feature point a pixel whose pixel value differs from pixel values of adjacent pixels in the vertical direction, in the horizontal direction, and the diagonal directions by an amount larger than a threshold $T_1$.

(2) Details of Processing Performed by Destination Identification Unit 503

Figure 7A:
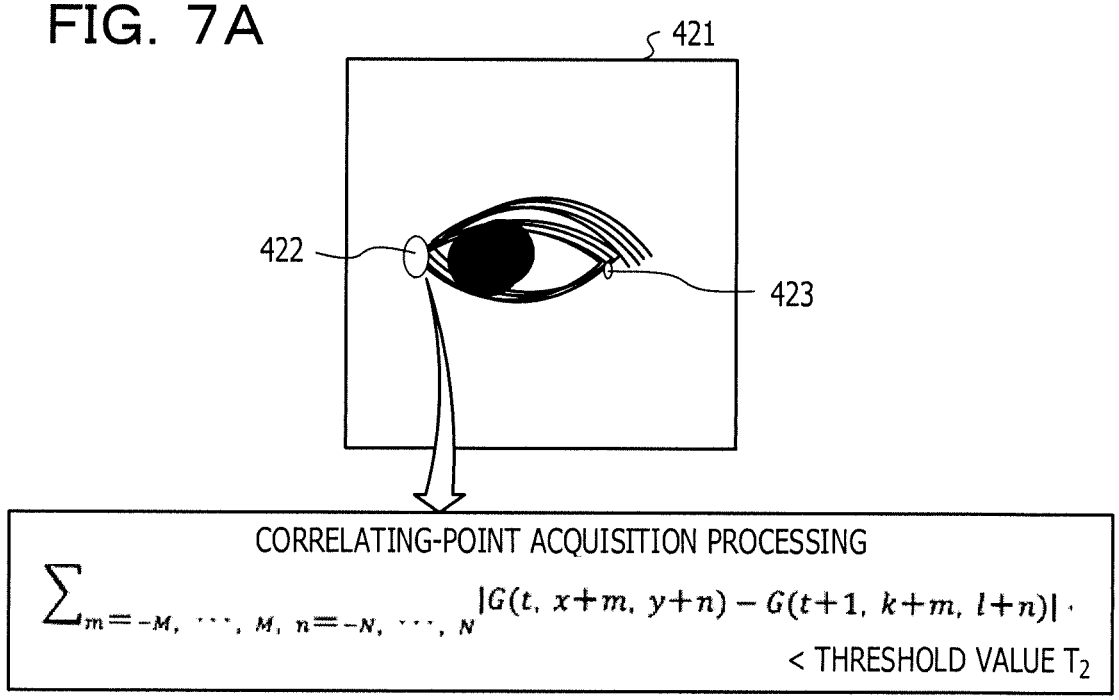
FIGS. 7A and 7B depict a specific example of correlating-point acquisition processing and position-of-center-of-gravity calculation processing performed by a destination identification unit.
Figure 7B:
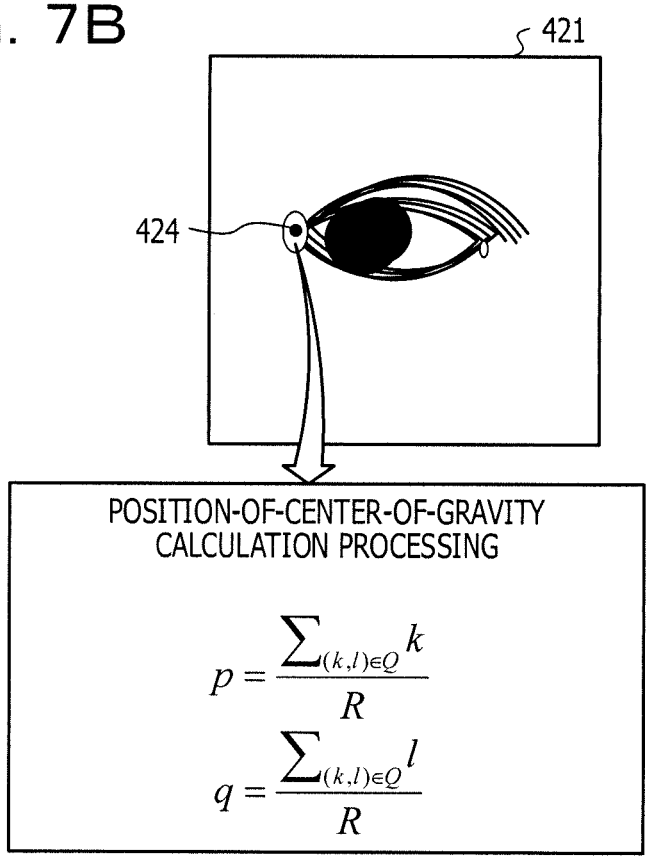

FIGS. 7A and 7B depict a specific example of correlating-point acquisition processing and position-of-center-of-gravity calculation processing performed by the destination identification unit. As depicted in FIG. 7A, in accordance with the following expression, the destination identification unit 503, for example, extracts the set of correlating points 422 (coordinates expressed as (k, l)) from the region 421 for the feature point 412 (coordinates expressed as (x, y)) extracted from the region 411 by the feature-point extraction unit 502.

$$\Sigma_{m=-M,\ldots,M,n=-N,\ldots,N}|G(t,x+m,y+n)-G(t+1,k+m,l+n)|<\text{threshold } T_2 \quad \text{[Math 2]}$$

In other words, the destination identification unit 503 first extracts pixel values ((2M+1)×(2N+1) pixel values) of pixels corresponding to the feature point 412 and the points in the vicinity of the feature point 412 from the region 411 in the frame to be processed (frame captured at the time point t).

Then, the destination identification unit 503 extracts pixel values ((2M+1)×(2N+1) pixel values) of pixels corresponding to the point (k, l) and the points in the vicinity of the point (k, l) from the region 421 in the frame (frame captured at the time point t+1) immediately following the frame to be processed.

Next, the destination identification unit 503 calculates a difference between each of the pixel values of (2M+1)×(2N+1) pixels extracted for the feature point 412 (coordinates expressed as (x, y)) and a corresponding one of the pixel values of (2M+1)×(2N+1) pixels extracted for the point (k, l) and calculates the sum of the differences.

Subsequently, the destination identification unit 503 determines whether the sum of the calculated differences is less than a threshold $T_2$ and acquires the point (k, l) as a correlating point if the sum is determined to be less than the threshold $T_2$.

The destination identification unit 503 acquires a set of correlating points that correlate well with the feature point 412 by performing similar processing for all the points (k, l) in the region 421. The destination identification unit 503 also acquires a set of correlating points for each of the feature points by performing similar processing for all the feature points in the region 411.

In addition, as depicted in FIG. 7B, the destination identification unit 503 calculates, for example, the position of the center of gravity (p, q) of the acquired set of correlating points 422 in accordance with the following expressions and identifies the destination 424.

$$p = \frac{\sum_{(k,l)\in Q} k}{R}$$

$$q = \frac{\sum_{(k,l)\in Q} l}{R} \quad \text{[Math 3]}$$

Here, R denotes the number of correlating points included in the set of correlating points 422. Q denotes the set of correlating points 422. In other words, the destination identification unit 503 calculates the center in the horizontal direction and the center in the vertical direction of the correlating points included in the set of correlating points 422 as the position of the center of gravity (p, q).

(3) Details of Processing Performed by Degree-of-Overlapping Calculation Unit 504

Figure 8:
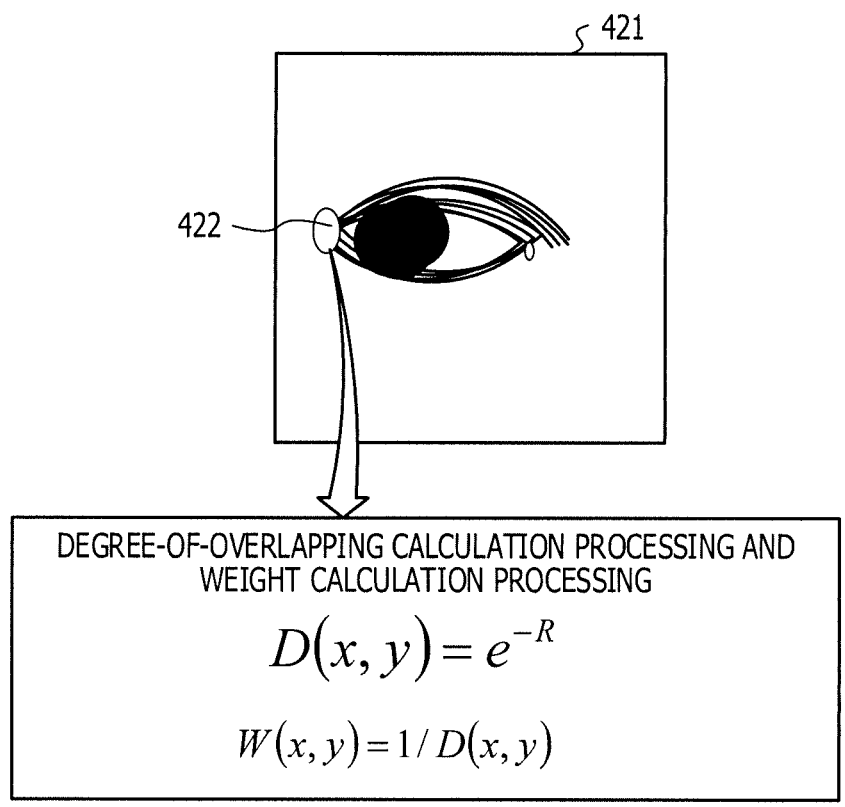
FIG. 8 depicts a specific example of degree-of-overlapping calculation processing and weight calculation processing performed by a degree-of-overlapping calculation unit.

FIG. 8 depicts a specific example of degree-of-overlapping calculation processing and weight calculation processing performed by the degree-of-overlapping calculation unit. As depicted in FIG. 8, the degree-of-overlapping calculation unit 504 uses the number R of the correlating points included in the set of correlating points 422 and calculates a degree of overlapping for the destination 424 of the feature point 412 (coordinates expressed as (x, y)) in accordance with the following expression.

$$D(x,y)=e^{-R} \quad \text{[Math 4]}$$

In other words, the degree of overlapping calculated by the degree-of-overlapping calculation unit 504 decreases as the number of the correlating points included in the set of correlating points 422 increases, and increases as the number of the correlating points included in the set of correlating points 422 decreases.

As depicted in FIG. 8, the degree-of-overlapping calculation unit 504 also calculates a weight (w(x, y)) for the destination 424 of the feature point 412 (coordinates expressed as (x, y)) using the calculated degree of overlapping in accordance with the following expression.

$$w(x,y)=1/D(x,y) \quad \text{[Math 5]}$$

In other words, the weight calculated by the degree-of-overlapping calculation unit 504 increases as the number of the correlating points included in the set of correlating points 422 increases, and decreases as the number of the correlating points included in the set of correlating points 422 decreases.

(4) Details of Processing Performed by Weight Adjustment Unit 505

Figure 9:
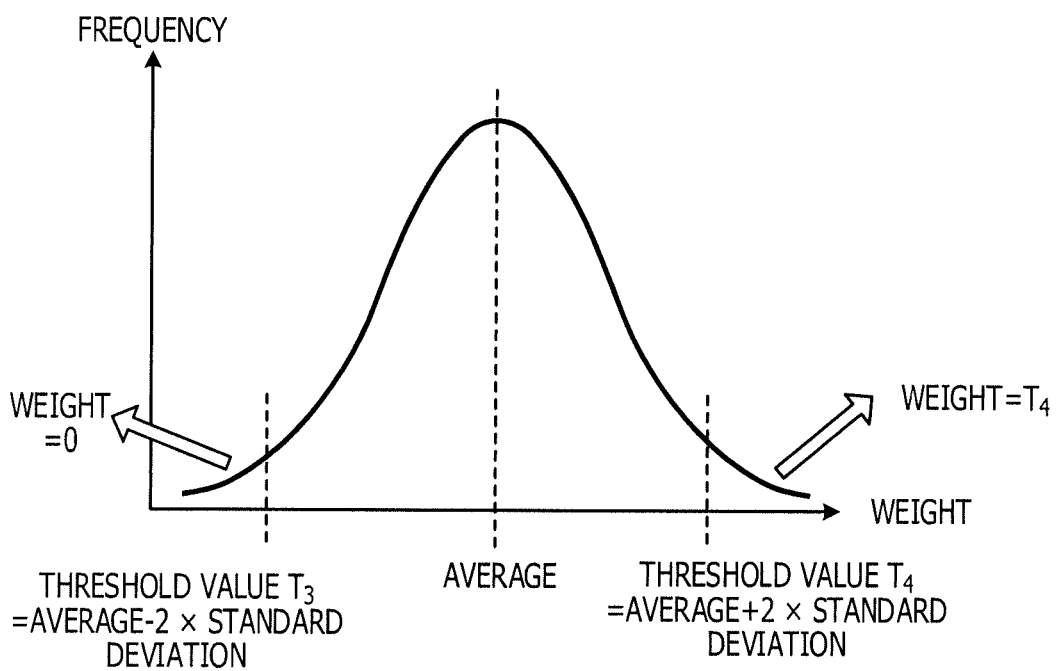
FIG. 9 depicts a specific example of weight adjustment processing performed by a weight adjustment unit.

FIG. 9 depicts a specific example of weight adjustment processing performed by the weight adjustment unit. As depicted in FIG. 9, a frequency distribution of weights calculated for the feature points included in the region 411 resembles a normal distribution. Thus, the weight adjustment unit 505 processes the weights of the feature points statistically.

Specifically, the weight adjustment unit 505 changes a weight of a feature point that has a calculated weight smaller than a threshold $T_3$ to zero. The threshold $T_3$, which is a lower threshold in the frequency distribution of the weights, is calculated, for example, in accordance with the following expression.

$$\text{threshold } T_3 = \text{average} - 2 \times (\text{standard deviation}) \quad \text{[Math 6]}$$

Here, a small calculated weight means a small number of corresponding correlating points, and a small number of correlating points means a large degree of overlapping of blurred portions. Because a position of a destination identified in a case of a large degree of overlapping of blurred portions has a low degree of accuracy, the weight adjustment unit 505 changes the weight to zero and excludes the amount of displacement of the feature point from the weighted averaging processing. Thus, the accuracy of calculating the amount of movement can be improved.

Further, the weight adjustment unit 505 changes a weight of a feature point that has a calculated weight larger than a threshold $T_4$ to $T_4$. The threshold $T_4$, which is an upper threshold in the frequency distribution of the weights, is calculated, for example, in accordance with the following expression.

$$\text{threshold } T_4 = \text{average} + 2 \times (\text{standard deviation}) \quad \text{[Math 7]}$$

Here, a large calculated weight means a large number of corresponding correlating points, and a large number of correlating points means a small degree of overlapping of blurred portions. Because a position of a destination identified in a case of a small degree of overlapping of blurred portions has a high degree of accuracy, the weight adjustment unit 505 includes the amount of displacement of the feature point in the weighted averaging processing. However, the existence of feature points having weights that are too large may affect the result of amount-of-movement calculation processing. Thus, the weight adjustment unit 505 changes a weight to $T_4$ for all the weights larger than the threshold $T_4$. In this way, the calculation result does not depend on amounts of displacements of some of the feature points, and the accuracy of calculating the amount of movement can be further improved.

(5) Details of Processing Performed by Weighted Averaging Unit 506

Figure 10:
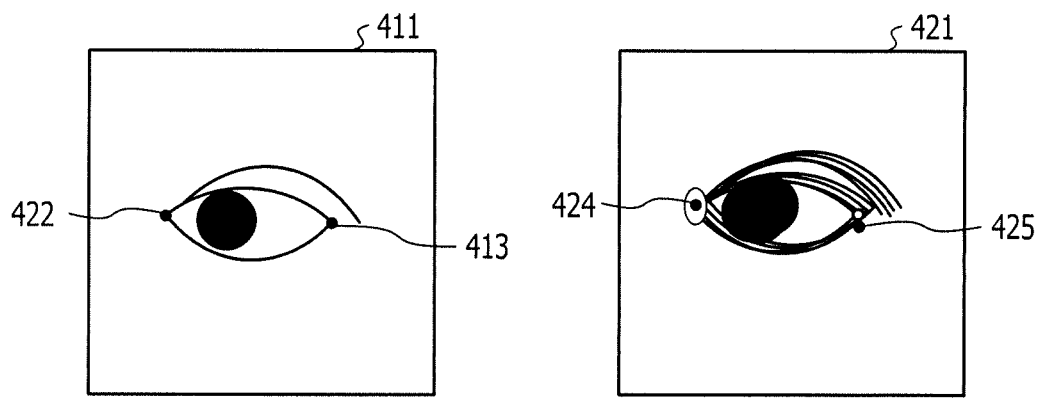
FIG. 10 depicts a specific example of weighted averaging processing performed by a weighted averaging unit.

FIG. 10 depicts a specific example of weighted averaging processing performed by the weighted averaging unit. As depicted in FIG. 10, the weighted averaging unit 506 calculates an amount of face movement of the person who is the image-capture target (amount of movement u in the horizontal direction and amount of movement v in the vertical direction) in accordance with the following expressions.

$$u = \Sigma_{(x,y) \in P}(p-x) \times w(x,y)/W$$

$$v = \Sigma_{(x,y) \in P}(q-y) \times w(x,y)/W \quad \text{[Math 8]}$$

where $W = \Sigma_{(x,y) \in P} w(x,y)$

In other words, the weighted averaging unit 506 calculates the amount of movement u in the horizontal direction by normalizing a weight (w(x, y)) of a feature point having the coordinates (x, y) by using the sum total of the weights of the feature points and multiplying the amount of displacement (p−x) of the feature point by the corresponding normalized weight. Performing the calculation this way reduces a possibility that a calculation result of an amount of movement for a frame that has a larger total number of acquired correlating points differs from a calculation result of an amount of movement for a frame that has the same amount of movement and a smaller total number of acquired correlating points. Here, P denotes a set of feature points.

Similarly, the weighted averaging unit 506 calculates the amount of movement v in the vertical direction by normalizing a weight (w(x, y)) of a feature point having the coordinates (x, y) by using the sum total of the weights of the feature points and multiplying the amount of movement (q−y) of the feature point by the corresponding normalized weight.

Consequently, for example, it is possible to make a proportion for which the amount of displacement of the feature point 413 to the destination 425 accounts in the amount of movement (u, v) smaller than a proportion for which the amount of displacement of the feature point 412 to the destination 424 accounts in the amount of movement (u, v). In other words, when an amount of movement is calculated, the effect of a decrease in the accuracy of calculating the destination of a feature point is reduced, leading to an improvement in the accuracy of calculating the amount of movement.

<Flow of Amount-of-Movement Calculation Processing Performed by Amount-of-Movement Calculation Unit>

Figure 11:
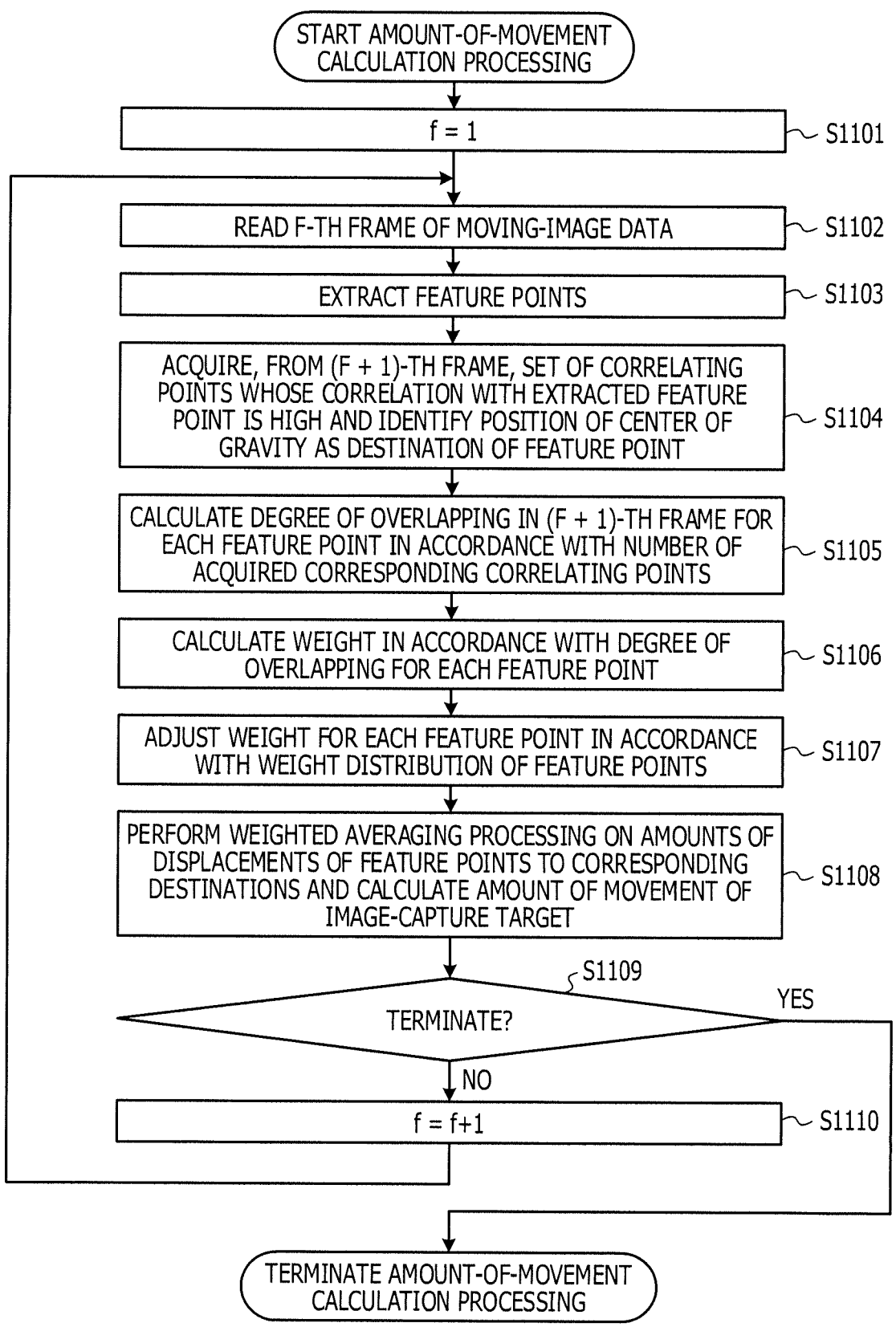
FIG. 11 is a flowchart of the amount-of-movement calculation processing performed by the amount-of-movement calculation unit.

Next, the entire flow of the amount-of-movement calculation processing performed by the amount-of-movement calculation unit 121 will be described. FIG. 11 is a flowchart of the amount-of-movement calculation processing performed by the amount-of-movement calculation unit. When the amount-of-movement calculation unit 121 is activated, the processing illustrated by the flowchart in FIG. 11 is executed.

In step S1101, the moving-image acquisition unit 501 substitutes 1 into a frame counter f.

In step S1102, the moving-image acquisition unit 501 reads an f-th frame of the moving-image data from the moving-image data storage 122.

In step S1103, the feature-point extraction unit 502 extracts a plurality of feature points of the image-capture-target object from the f-th frame.

In step S1104, the destination identification unit 503 acquires from an (f+1)-th frame a set of correlating points whose correlation with one of the feature points extracted from the f-th frame meets a predetermined condition, calculates the position of the center of gravity of the acquired set of correlating points, and identifies the position of the center of gravity as the destination of the feature point.

The destination identification unit 503 performs similar processing for all of the plurality of feature points extracted in step S1103 and identifies the destinations of all the feature points.

In step S1105, for each of the feature points in the f-th frame, the degree-of-overlapping calculation unit 504 calculates a degree of overlapping in the (f+1)-th frame in accordance with the number of the corresponding correlating points acquired for the feature point.

In step S1106, the degree-of-overlapping calculation unit 504 calculates a weight for an amount of displacement of each of the feature points in the f-th frame in accordance with the calculated degrees of overlapping.

In step S1107, the weight adjustment unit 505 statistically processes the weights calculated by the degree-of-overlapping calculation unit 504 and adjusts the weights.

In step S1108, the weighted averaging unit 506 performs weighted averaging processing using the adjusted weights on the amounts of displacements of the feature points in the f-th frame to the corresponding destinations in the (f+1)-th frame and calculates the amount of movement of the image-capture-target object.

In step S1109, the moving-image acquisition unit 501 determines whether the amount-of-movement calculation processing is terminated, and the process proceeds to step S1110 if the moving-image acquisition unit 501 determines that the amount-of-movement calculation processing is not terminated (No in step S1109).

In step S1110, the moving-image acquisition unit 501 increments the frame counter f, and the process returns to step S1102.

On the other hand, if it is determined that the amount-of-movement calculation processing is terminated in step S1109 (Yes in step S1109), the amount-of-movement calculation processing is terminated.

As is apparent in the above description, the amount-of-movement calculation apparatus 120 according to the first embodiment extracts a plurality of feature points included in an image-capture-target object from the f-th frame of moving-image data. The amount-of-movement calculation apparatus 120 according to the first embodiment acquires, from the (f+1)-th frame, a set of correlating points each of which has a correlation with one of the plurality of feature points extracted from the f-th frame, the correlation being higher than a predetermined threshold. Then, the amount-of-movement calculation apparatus 120 according to the first embodiment identifies the position of the center of gravity of the acquired set of correlating points as the destination in the (f+1)-th frame of the one of the plurality of feature points in the f-th frame. Further, the amount-of-movement calculation apparatus 120 according to the first embodiment calculates an amount of movement of the image-capture-target object by performing weighted averaging processing of amounts of displacements of the feature points by using a weight in accordance with the number of correlating points included in the set of the correlating points of each of the feature points.

Thus, even when the destinations of the feature points are not accurately identified because of overlapping blurred portions, the amount-of-movement calculation apparatus 120 according to the first embodiment calculates the amount of movement so as to reduce the effect of the overlapping blurred portions.

Consequently, by using the amount-of-movement calculation apparatus 120 according to the first embodiment, the accuracy of calculating the amount of movement is improved.

Second Embodiment

In a second embodiment, a description will be provided of an operation support system to which the amount-of-movement calculation apparatus 120 according to the first embodiment is applied. By using the amount-of-movement calculation apparatus 120 according to the first embodiment, an amount of face movement of a person who is an image-capture target is accurately calculated.

Thus, in the second embodiment, a description will be provided of a case where the amount-of-movement calculation apparatus 120 is employed in a situation where a customer-relations operation of a salesperson who is engaged in operations such as sales is evaluated.

<System Configuration of Operation Support System>

Figure 12:
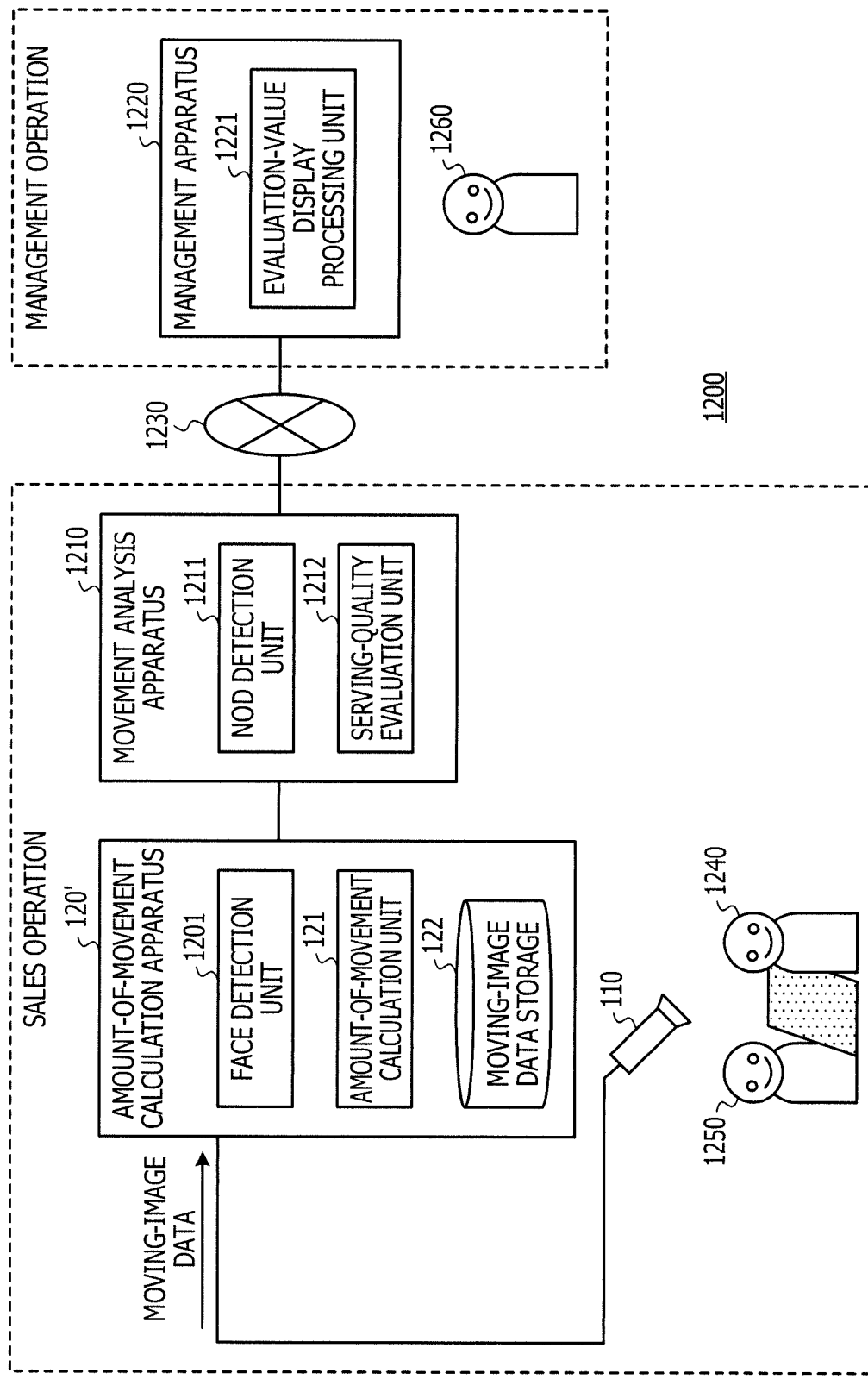
FIG. 12 depicts an example system configuration of an operation support system that includes an amount-of-movement calculation apparatus according to a second embodiment.

First, a description will be provided of a system configuration of an operation support system to which the amount-of-movement calculation apparatus according to the first embodiment described above is applied. FIG. 12 depicts an example system configuration of an operation support system that includes an amount-of-movement calculation apparatus according to the second embodiment.

As depicted in FIG. 12, an operation support system 1200 includes the image capturing apparatus 110, an amount-of-movement calculation apparatus 120', a movement analysis apparatus 1210, and a management apparatus 1220.

Of these apparatuses, the image capturing apparatus 110, the amount-of-movement calculation apparatus 120', and the movement analysis apparatus 1210 are situated in a shop where a salesperson 1240 performs a sales operation. The management apparatus 1220 is situated in a management center where a manager 1260 who manages the salesperson 1240 performs a management operation. The movement analysis apparatus 1210 and the management apparatus 1220 are coupled to each other via a network 1230.

The amount-of-movement calculation apparatus 120' is an apparatus that is the amount-of-movement calculation apparatus 120 in the first embodiment described above, to which a face detection unit 1201 is added. In the second embodiment, a person who is an image-capture target and whose image is captured by the image capturing apparatus 110 is the salesperson 1240, and an amount of face movement of the salesperson 1240 is calculated. Thus, the amount-of-movement calculation apparatus 120' includes the face detection unit 1201, which detects a face region of the salesperson 1240 in each frame of moving-image data obtained by image capturing.

The movement analysis apparatus 1210 is an apparatus that analyzes the amount of face movement of the salesperson 1240 that is output from the amount-of-movement calculation apparatus 120'. A nod detection program and a serving-quality evaluation program are installed in the movement analysis apparatus 1210, and the movement analysis apparatus 1210 functions as a nod detection unit 1211 and a serving-quality evaluation unit 1212 by executing these programs.

The nod detection unit 1211 is an example of a determination unit and determines whether the salesperson 1240 nods while serving a customer 1250 in accordance with an amount of face movement of the salesperson 1240 that is output from the amount-of-movement calculation apparatus 120'. When it is determined that a nod occurs, the nod detection unit 1211 also calculates parameters that quantify the nod.

The serving-quality evaluation unit 1212 calculates an evaluation value obtained as a result of evaluation of a serving quality of the salesperson 1240 in accordance with the parameters calculated by the nod detection unit 1211. The serving-quality evaluation unit 1212 transmits the calculated evaluation value in association with the time information to the management apparatus 1220.

An evaluation-value display processing program is installed in the management apparatus 1220. The management apparatus 1220 functions as an evaluation-value display processing unit 1221 by executing the evaluation-value display processing program.

The evaluation-value display processing unit 1221 is an example of a display unit and displays the evaluation value transmitted from the movement analysis apparatus 1210 in association with the time information. Thus, the manager 1260 keeps track of a serving quality of the salesperson 1240 at each time point.

<Details of Processing Performed by Units of Apparatuses of Operation Support System>

Next, details of processing performed by the units of the apparatuses of the operation support system 1200 will be described. Description of the processing described above in the first embodiment will be omitted.

(1) Details of Processing Performed by Face Detection Unit 1201 of Amount-of-Movement Calculation Apparatus 120'

Figure 13:
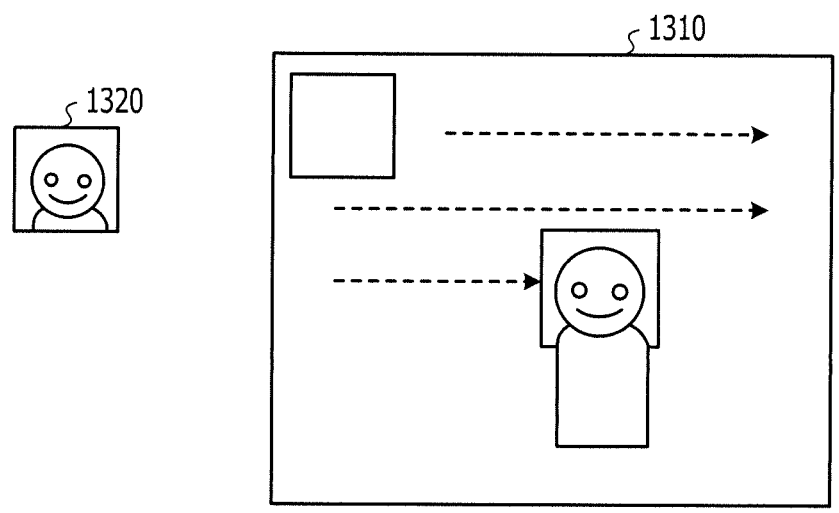
FIG. 13 depicts a specific example of face detection processing performed by a face detection unit.

FIG. 13 depicts a specific example of face detection processing performed by the face detection unit. As depicted in FIG. 13, it is assumed that a pixel (coordinates expressed as (k, l)) included in a frame 1310 captured at a time point t has a pixel value G(t, k, l) and a pixel (coordinates expressed as (X, Y)) in a face image 1320 of the salesperson 1240 has a pixel value F(X, Y). In this case, the face detection unit 1201 detects the face region in accordance with the following expression.

$$\Sigma_{m=-X,\ldots,X, n=-Y,\ldots,Y} |F(X+m, Y+n) - G(t, k+m, l+n)| < \text{threshold } T_5 \quad \text{[Math 9]}$$

In other words, the face detection unit 1201 first extracts pixel values ((2X+1)×(2Y+1) pixel values) of pixels in the face image 1320 of the salesperson 1240. Then, the face detection unit 1201 extracts pixel values ((2X+1)×(2Y+1) pixel values) of pixels corresponding to the point (k, l) and the points in the vicinity of the point (k, l) in the frame 1310 to be processed (frame 1310 captured at the time point t).

Next, the face detection unit 1201 calculates a difference between each of the pixel values of the (2X+1)×(2Y+1) pixels extracted from the face image 1320 and the corresponding one of the pixel values of the (2X+1)×(2Y+1) pixels extracted for the point (k, l) in the frame 1310 and calculates the sum of the differences.

Subsequently, the face detection unit 1201 determines whether the sum of the calculated differences is less than a threshold $T_5$ and detects as the face region a rectangular region that includes the (2X+1)×(2Y+1) pixels extracted for the point (k, l) if the sum is determined to be less than the threshold $T_5$. If a plurality of face regions are detected from the frame 1310, the face detection unit 1201 chooses a rectangular region for which the sum of the differences is smallest as the face region.

(2) Details of Processing Performed by Nod Detection Unit 1211 of Movement Analysis Apparatus 1210

Figure 14:
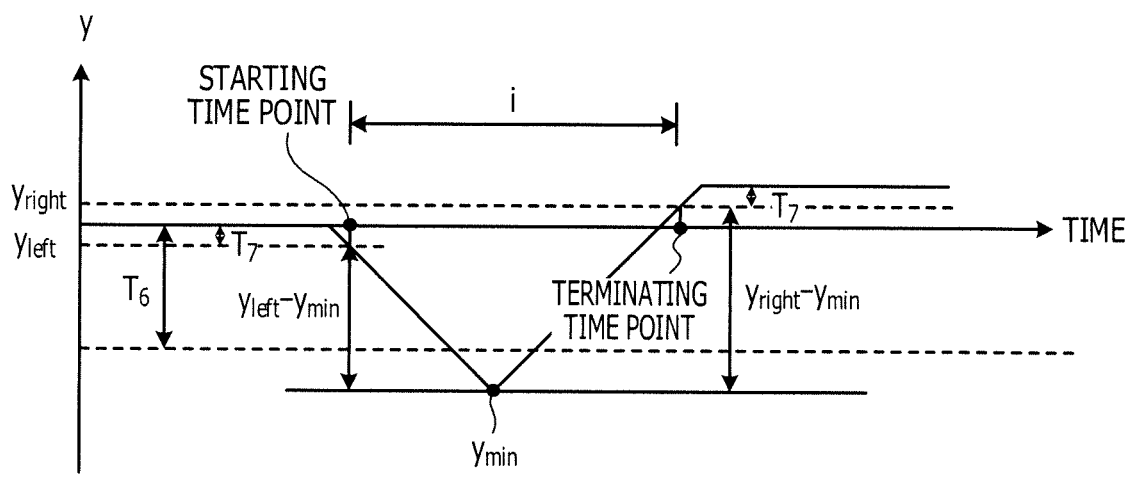
FIG. 14 depicts a specific example of nod detection processing performed by a nod detection unit.

FIG. 14 depicts a specific example of nod detection processing performed by the nod detection unit. In FIG. 14, the horizontal axis denotes time, and the vertical axis denotes a position y of the face region of the salesperson 1240 in the vertical direction. The position y is output from the amount-of-movement calculation apparatus 120'.

The nod detection unit 1211 determines that a nod has occurred if the position y in the vertical direction that is output from the amount-of-movement calculation unit 120' increases by an amount larger than or equal to a threshold $T_6$ after the position y in the vertical direction decreases by an amount larger than or equal to the threshold $T_6$. FIG. 14 depicts a temporal change of the position y in the vertical direction when the nod detection unit 1211 determines that a nod has occurred.

When it is determined that a nod has occurred, the nod detection unit 1211 calculates parameters (i, j), which quantify the nod. When it is determined that a nod has occurred, in a time period in which the position y in the vertical direction temporally changes, a time point when the position y in the vertical direction decreases and deviates from the position before the temporal change starts by a threshold $T_7$ before the position y in the vertical direction reaches the minimum value $y_{min}$ is determined to be the starting time point. The position y in the vertical direction at the starting time point is denoted by $y_{left}$. A time point when the position y in the vertical direction increases and deviates from the position after the temporal change ends by the threshold $T_7$ after the position y in the vertical direction reaches the minimum value $y_{min}$ is determined to be the terminating time point. The position y in the vertical direction at the terminating time point is denoted by $y_{right}$. Then, the parameters (i, j) that quantify the nod are defined as follows.

$i$=terminating time point−starting time point $$j = ((y_{left} - y_{min}) + (y_{right} - y_{min}))/2 \quad \text{[Math 10]}$$

In short, the nod detection unit 1211 determines whether a nod has occurred in accordance with the position y in the vertical direction and calculates a duration of the nod (a length i) and an amount of motion of the nod (a depth j) as the parameters that quantify the nod.

(3) Details of Processing Performed by Serving-Quality Evaluation Unit 1212 of Movement Analysis Apparatus 1210

Figure 15A:
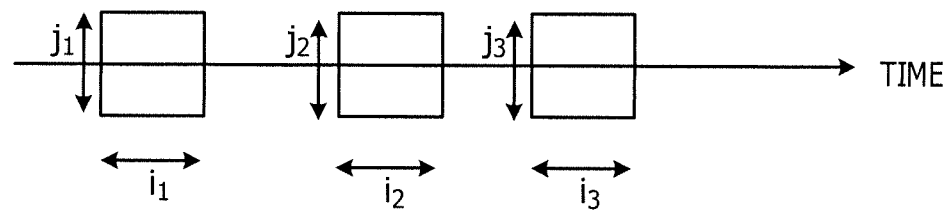
FIGS. 15A and 15B depict specific examples of serving-quality evaluation processing performed by a serving-quality evaluation unit.
Figure 15B:
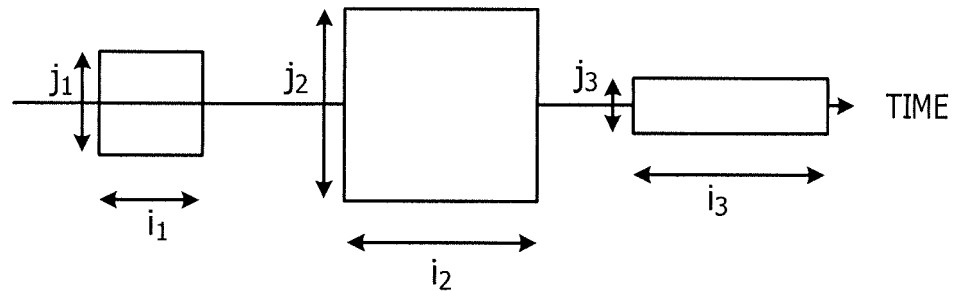

FIGS. 15A and 15B depict specific examples of serving-quality evaluation processing performed by the serving-quality evaluation unit. In FIGS. 15A and 15B, the horizontal axis denotes time, and each of the rectangles on the time axis represents the length (i) and the depth (j) of a nod. The length of the horizontal side of a rectangle on the time axis represents the length (i) of a nod. The length of the vertical side of a rectangle on the time axis represents the depth (j) of a nod.

It is commonly known that when a listener continues nodding in the same way, a speaker generally doubts that the listener is truly listening to the speaker. The serving-quality evaluation unit 1212 evaluates the serving quality of the salesperson 1240 in accordance with such common knowledge.

Specifically, the serving-quality evaluation unit 1212 decrements r by one from k−1 in succession while both of the following expressions are satisfied and calculates the number of times C=k−r when at least one of the following expressions is not satisfied, where $i_k$ denotes the length of the k-th nod and $j_k$ denotes the depth of the k-th nod.

$$|i_k - i_r| < \text{threshold } T_8$$

$$|j_k - j_r| < \text{threshold } T_8 \quad \text{[Math 11]}$$

Then, the serving-quality evaluation unit 1212 substitutes the calculated number of times C into the following expression and calculates an evaluation value H of the serving quality of the salesperson 1240.

$$H = 1/C \quad \text{[Math 12]}$$

When the salesperson 1240 nods as depicted in FIG. 15A, the evaluation value H of the serving quality of the salesperson 1240 decreases. On the other hand, when the salesperson 1240 nods as depicted in FIG. 15B, the evaluation value H of the serving quality of the salesperson 1240 increases.

(4) Details of Processing Performed by Evaluation-Value Display Processing Unit 1221 of Management Apparatus 1220

Figure 16:
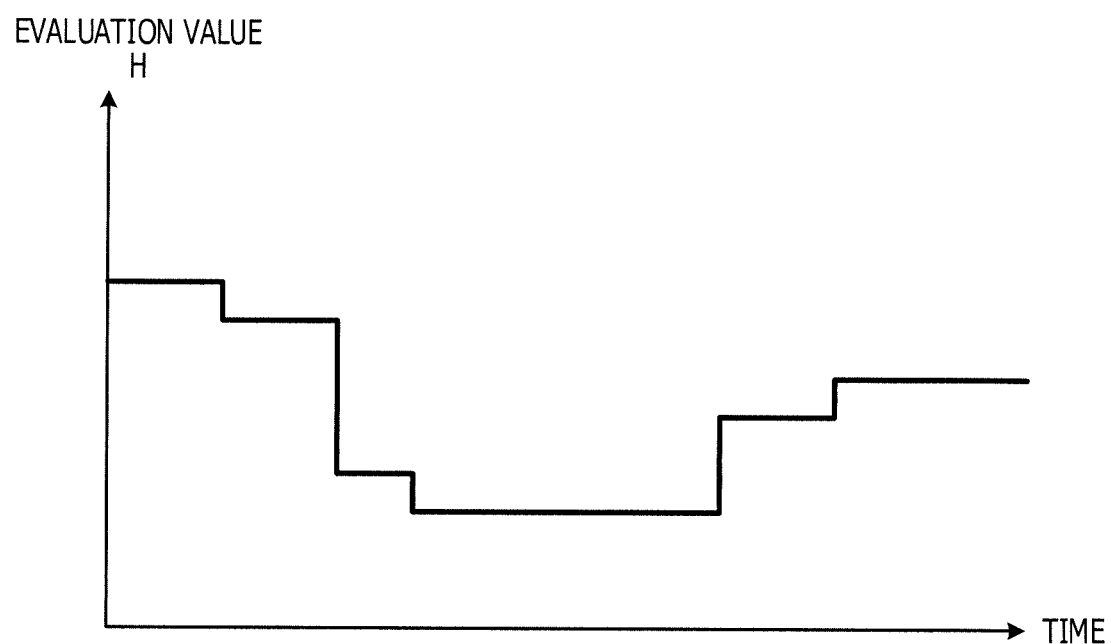
FIG. 16 depicts a specific example of evaluation-value display processing performed by an evaluation-value display processing unit.

FIG. 16 depicts a specific example of the evaluation-value display processing performed by the evaluation-value display processing unit. In FIG. 16, the horizontal axis denotes time, and the vertical axis denotes the evaluation value H transmitted from the movement analysis apparatus 1210.

As depicted in FIG. 16, the evaluation-value display processing unit 1221 displays the evaluation value H transmitted from the movement analysis apparatus 1210 in a graph in association with time information. Thus, the manager 1260 easily keeps track of temporal variations of the evaluation value H of the serving quality of the salesperson 1240.

<Flows of Processing Performed by Apparatuses of Operation Support System>

Next, flows of processing performed by the apparatuses included in the operation support system 1200 will be described.

(1) Flow of Amount-of-Face-Movement Calculation Processing Performed by Amount-of-Movement Calculation Apparatus 120'

Figure 17:
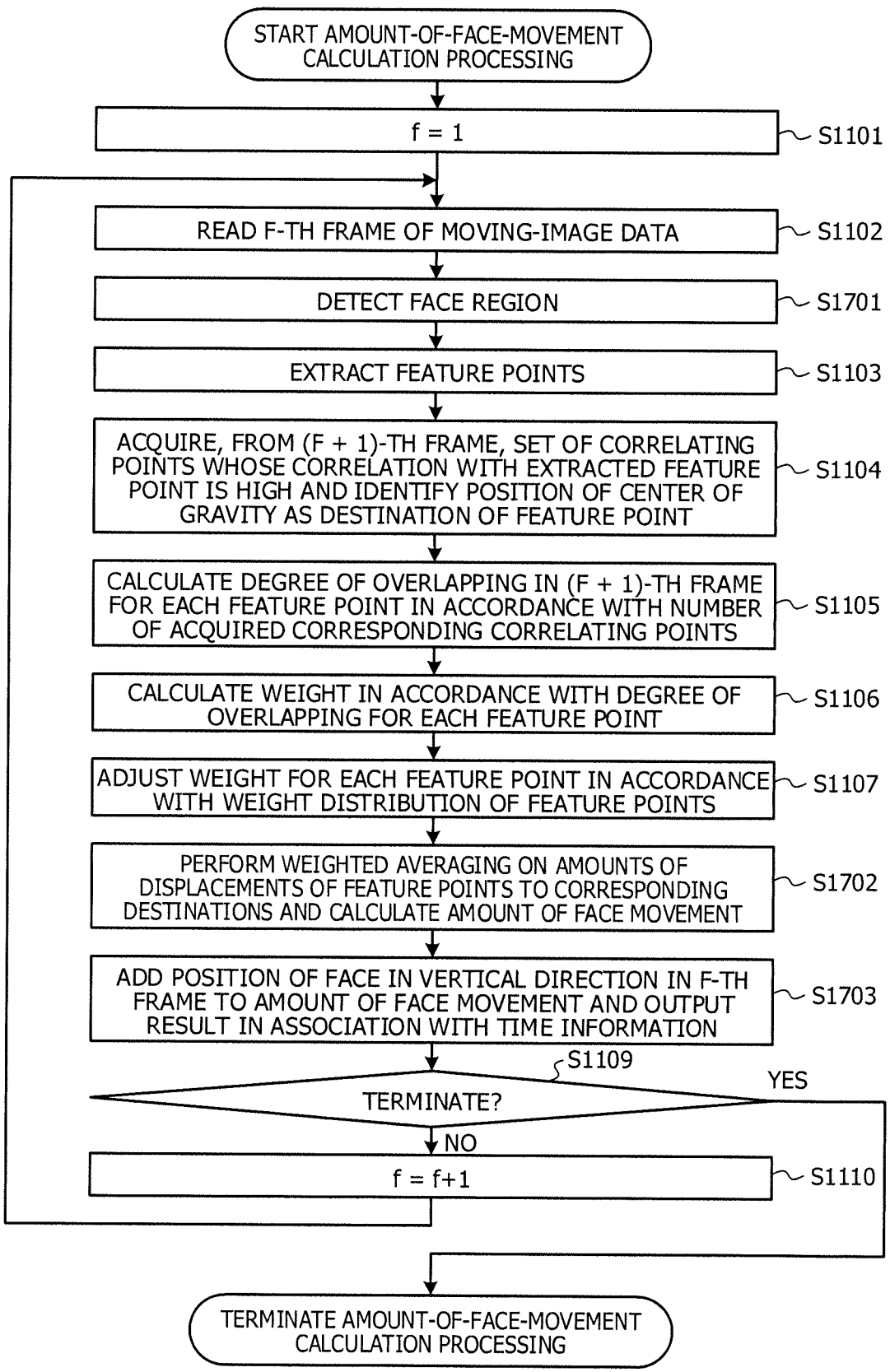
FIG. 17 is a flowchart of amount-of-face-movement calculation processing performed by an amount-of-movement calculation unit.

FIG. 17 is a flowchart of amount-of-face-movement calculation processing performed by the amount-of-movement calculation unit. Steps that differ from those in FIG. 11 are steps S1701, S1702, and S1703.

In step S1701, the face detection unit 1201 detects a face region from an f-th frame. Hereinafter, processing from step S1103 to step S1107 is performed for the face region detected in step S1701.

In step S1702, the weighted averaging unit 506 performs weighted averaging processing using the adjusted weights on the amounts of displacements of the feature points in the f-th frame to the corresponding destinations in the (f+1)-th frame and calculates the amount of face movement.

In step S1703, the weighted averaging unit 506 adds the position of the face in the vertical direction in the f-th frame to the calculated amount of face movement and outputs the result in association with the time information to the movement analysis apparatus 1210.

(2) Analysis Flow Performed by Movement Analysis Apparatus 1210

Figure 18:
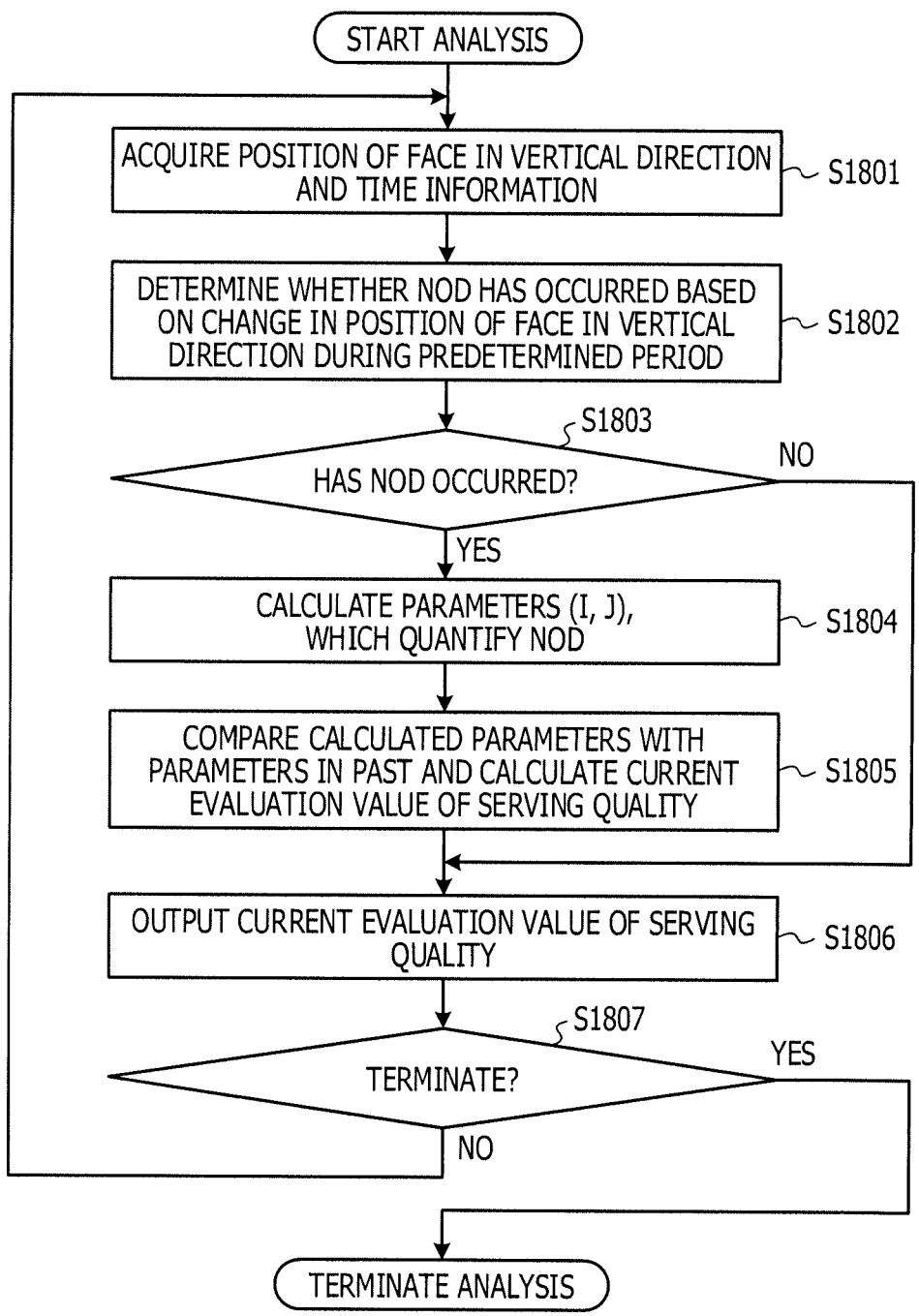
FIG. 18 is a flowchart of an analysis performed by a movement analysis apparatus.

FIG. 18 is a flowchart of an analysis performed by the movement analysis apparatus. In step S1801, the nod detection unit 1211 acquires the position of the face in the vertical direction and the time information that are output from the amount-of-movement calculation apparatus 120'.

In step S1802, the nod detection unit 1211 determines whether a nod has occurred based on the change in the position y of the face in the vertical direction during a predetermined period. Specifically, the nod detection unit 1211 determines whether the position y of the face in the vertical direction that is output from the amount-of-movement calculation unit 120' increases by an amount larger than or equal to the threshold $T_6$ after the position y in the vertical direction decreases by an amount larger than or equal to the threshold $T_6$.

In step S1802, the nod detection unit 1211 determines that a nod has occurred if the position y of the face in the vertical direction increases by an amount larger than or equal to the threshold $T_6$ after the position y of the face in the vertical direction decreases by an amount larger than or equal to the threshold $T_6$. In this case, the process proceeds from step S1803 to step S1804, and the nod detection unit 1211 calculates parameters (i, j), which quantify the nod.

In step S1805, the serving-quality evaluation unit 1212 compares the calculated parameters with the parameters (i, j) in the past and calculates a current evaluation value H of the serving quality.

In step S1806, the serving-quality evaluation unit 1212 transmits the current evaluation value H of the serving quality to the management apparatus 1220.

On the other hand, if it is determined in step S1803 that a nod has not occurred (No in step S1803), the process proceeds directly to step S1806. In this case, in step S1806, the serving-quality evaluation unit 1212 transmits to the management apparatus 1220 the same evaluation value H as the evaluation value H that has been previously transmitted.

In step S1807, the nod detection unit 1211 determines whether the analysis is terminated. If it is determined in step S1807 that the analysis is not terminated (No in step S1807), the process returns to step S1801. On the other hand, if it is determined in step S1807 that the analysis is terminated (Yes in step S1807), the analysis is terminated.

As is apparent in the above description, in the operation support system 1200, the movement analysis apparatus 1210 calculates the length and the depth of a nod of a salesperson who is engaged in operations such as sales in accordance with the position of the face in the vertical direction that is output from the amount-of-movement calculation apparatus 120'. In the operation support system 1200, the movement analysis apparatus 1210 also calculates and displays an evaluation value of serving quality of the salesperson in accordance with the calculated length and depth of the nod. Thus, the operation support system 1200 enables the serving quality of a salesperson who is engaged in operations such as sales to be managed.

Third Embodiment

In the second embodiment described above, the case where the operation support system 1200 includes the image capturing apparatus, the amount-of-movement calculation apparatus, the movement analysis apparatus, and the management apparatus has been described, but the system configuration of the operation support system is not limited to the above configuration.

For example, the functions of the amount-of-movement calculation apparatus and the movement analysis apparatus may be realized by a mobile terminal carried by a salesperson. When the evaluation value becomes lower than or equal to a predetermined threshold, a vibration function of the mobile terminal may be used to send a notification to the salesperson. Hereinafter, a third embodiment will be described, and the description will focus on differences between the third embodiment and the second embodiment.

<System Configuration of Operation Support System>

Figure 19:
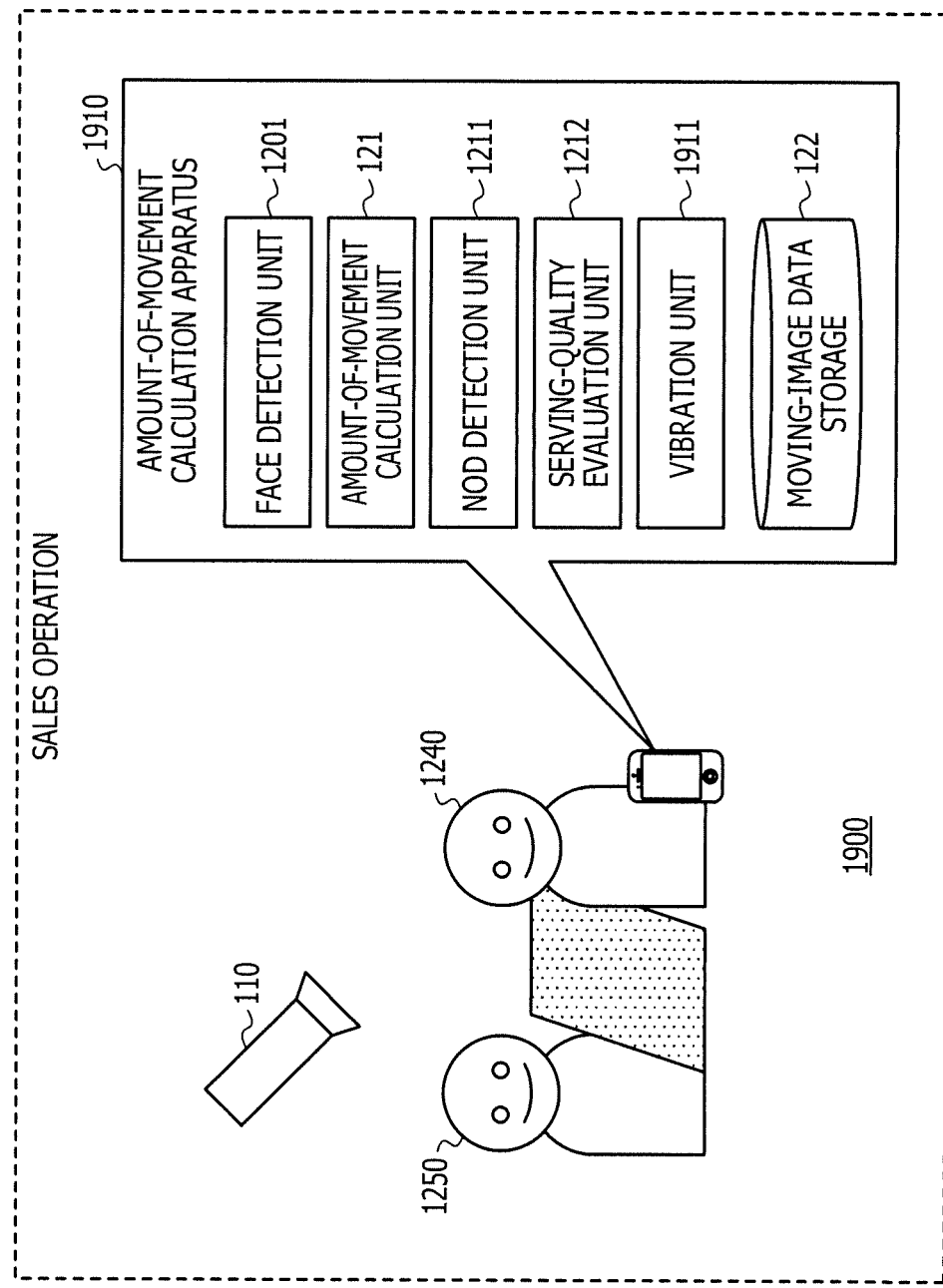
FIG. 19 depicts an example system configuration of an operation support system that includes an amount-of-movement calculation apparatus according to a third embodiment.

First, a description will be provided of a system configuration of an operation support system that includes an amount-of-movement calculation apparatus according to the third embodiment. FIG. 19 depicts an example system configuration of the operation support system that includes the amount-of-movement calculation apparatus according to the third embodiment.

As depicted in FIG. 19, an operation support system 1900 includes the image capturing apparatus 110 and an amount-of-movement calculation apparatus 1910. It is assumed that the image capturing apparatus 110 and the amount-of-movement calculation apparatus 1910 are wirelessly coupled to each other.

The amount-of-movement calculation apparatus 1910 according to the third embodiment is realized, for example, by using a mobile terminal. A face detection program, an amount-of-movement calculation program, a nod detection program, a serving-quality evaluation program, and a vibration program are installed in the amount-of-movement calculation apparatus 1910. The amount-of-movement calculation apparatus 1910 functions as the face detection unit 1201, the amount-of-movement calculation unit 121, the nod detection unit 1211, the serving-quality evaluation unit 1212, and a vibration unit 1911 by executing these programs.

Of the functions realized by the amount-of-movement calculation apparatus 1910, the face detection unit 1201, the amount-of-movement calculation unit 121, the nod detection unit 1211, and the serving-quality evaluation unit 1212 have been described in the first embodiment or the second embodiment, and a detailed description of these functions will be omitted.

The vibration unit 1911 is an example of a notification unit and activates a vibrator included in the amount-of-movement calculation apparatus 1910 when it is determined that an evaluation value H of the serving quality calculated by the serving-quality evaluation unit 1212 meets a predetermined condition. Thus, the salesperson 1240 is notified of a decrease in the serving quality and can recognize the decrease in the serving quality.

<Details of Processing Performed by Units of Amount-of-Movement Calculation Apparatus>

Figure 20:
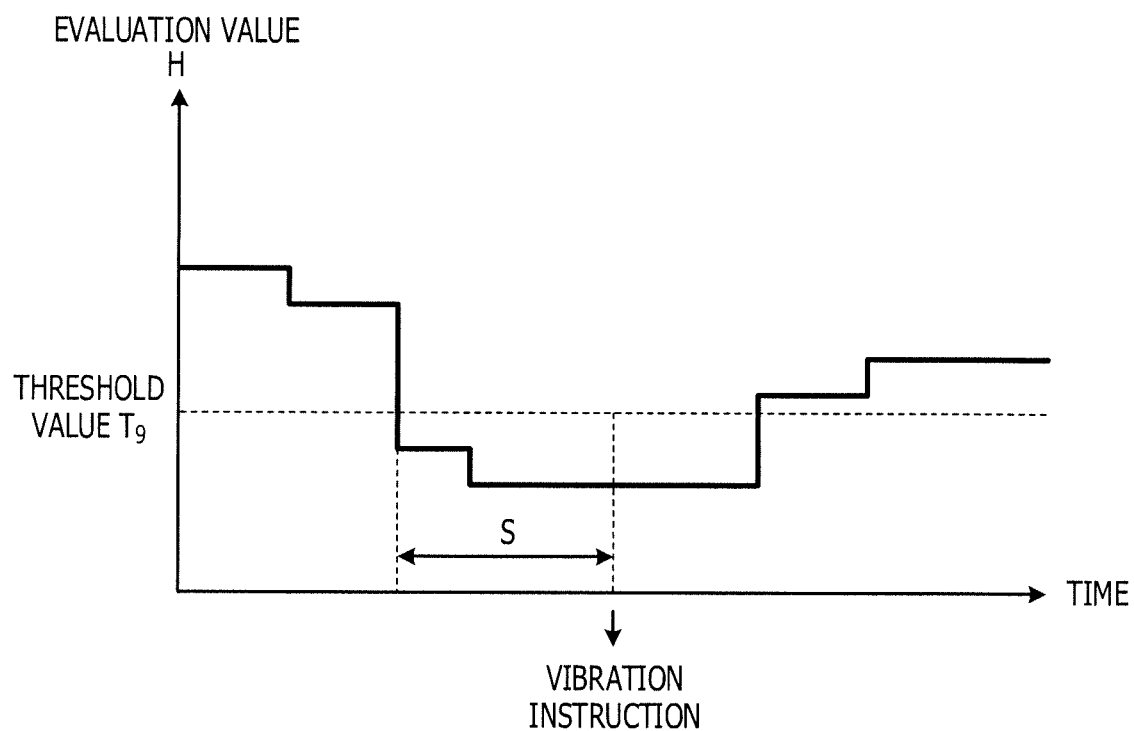
FIG. 20 depicts a specific example of vibration instruction processing performed by a vibration unit.

Next, details of processing performed by the units in the amount-of-movement calculation apparatus 1910 will be described. Here, details of vibration instruction processing performed by the vibration unit 1911 will be described. FIG. 20 depicts a specific example of vibration instruction processing performed by the vibration unit. In FIG. 20, the horizontal axis denotes time, and the vertical axis denotes the evaluation value H received from the serving-quality evaluation unit 1212.

As depicted in FIG. 20, the vibration unit 1911 outputs a vibration instruction when it is determined that the evaluation value H received from the serving-quality evaluation unit 1212 is less than or equal to a threshold $T_9$ for more than or equal to S seconds.

<Flow of Operation Support Processing Performed by Amount-of-Movement Calculation Apparatus>

Figure 21A:
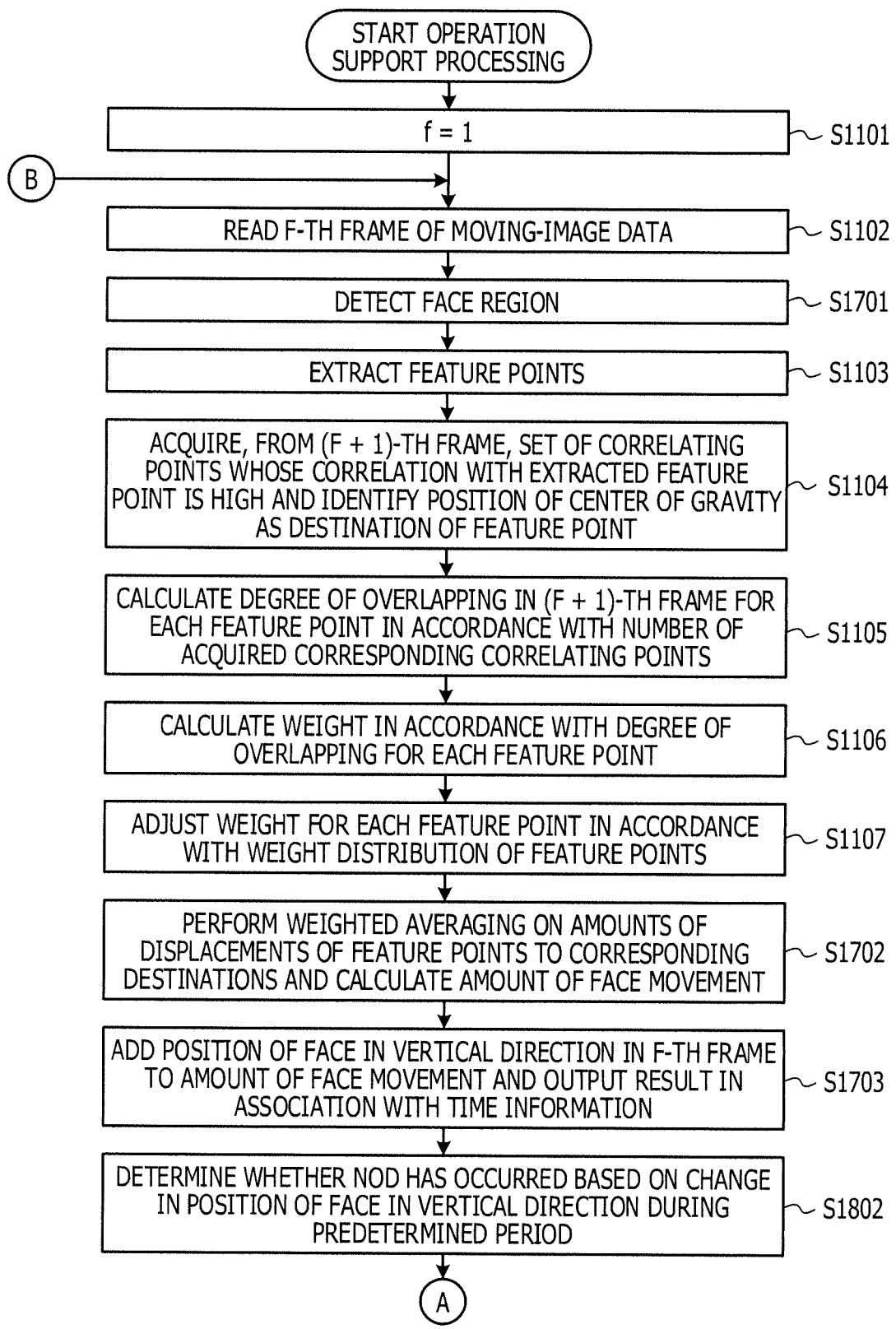
FIGS. 21A and 21B are flowcharts of operation support processing.
Figure 21B:
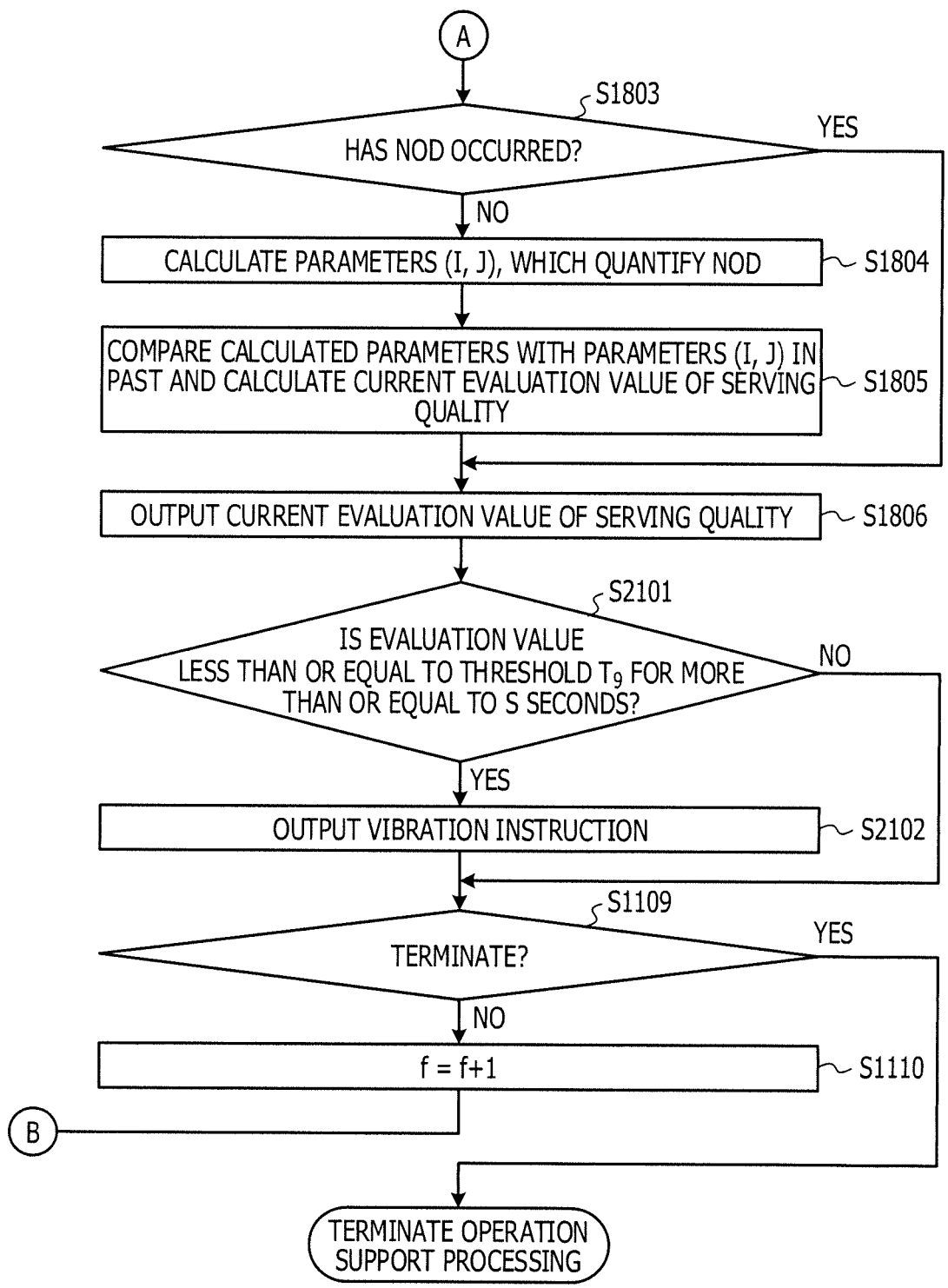

Next, a flow of operation support processing performed by the amount-of-movement calculation apparatus 1910 will be described. FIGS. 21A and 21B are flowcharts of the operation support processing. Steps that are similar to the steps included in the amount-of-face-movement calculation processing and the analysis described with reference to FIGS. 17 and 18 in the second embodiment described above are denoted by the same symbols, and the description of these steps will be omitted.

Steps that differ from the steps in the second embodiment are steps S2101 and S2102. In step S2101, the vibration unit 1911 determines whether the evaluation value H of the serving quality calculated by the serving-quality evaluation unit 1212 is less than or equal to the threshold $T_9$ for more than or equal to S seconds.

If it is determined in step S2101 that the evaluation value H of the serving quality is less than or equal to the threshold $T_9$ for more than or equal to S seconds, the process proceeds to step S2102, and the vibration unit 1911 outputs the vibration instruction and activates the vibrator included in the amount-of-movement calculation apparatus 1910.

On the other hand, if it is determined in step S2101 that the evaluation value H of the serving quality is less than or equal to the threshold $T_9$ for less than S seconds, the process proceeds directly to step S1109.

As is apparent in the above description, the operation support system 1900 monitors the evaluation value of the serving quality of a salesperson and notifies the salesperson if it is determined that the evaluation value meets a predetermined condition. Thus, the operation support system 1900 enables a salesperson who is engaged in operations such as sales to recognize a decrease in their serving quality immediately when their serving quality decreases.

Other Embodiments

In the first embodiment described above, a description has been provided of the case where the degree-of-overlapping calculation unit 504 calculates the weights after calculating the degree of overlapping in accordance with the number of correlating points. However, the degree-of-overlapping calculation unit 504 may calculate the weights directly in accordance with the number of correlating points.

Although the amount-of-movement calculation apparatus 120' and the movement analysis apparatus 1210 are separate in the second embodiment described above, the amount-of-movement calculation apparatus 120' and the movement analysis apparatus 1210 may be realized as a single apparatus. Some of the functions of the amount-of-movement calculation apparatus 120' or the movement analysis apparatus 1210 may be provided by the management apparatus 1220.

In the third embodiment described above, a description has been provided of the case where the amount-of-movement calculation apparatus 1910 includes the face detection unit 1201, the amount-of-movement calculation unit 121, the nod detection unit 1211, the serving-quality evaluation unit 1212, and the vibration unit 1911. However, of these functions provided by the amount-of-movement calculation apparatus 1910, functions other than the function of the vibration unit 1911 may be provided by an apparatus other than the amount-of-movement calculation apparatus 1910.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A method of determining an amount executed by a computer, method comprising:
    extracting a first feature point and a second feature point from a first image of an image-capture target;
    acquiring a first set of points having a correlation with the first feature point and a second set of points having a correlation with the second feature point from a second image being captured after the first image, the correlation meeting a first condition;
    identifying a first position of a center of gravity of the first set and a second position of a center of gravity of the second set;
    determining a first amount of movement of the image-capture target by performing first weighting processing, the first weighting processing being performed based on a number of points included in the first set and an amount of displacement from a position of the first feature point to the first position;
    determining a second amount of movement of the image-capture target by performing second weighting processing, the second weighting processing being performed based on a number of points included in the second set and an amount of displacement from a position of the second feature point to the second position;
    determining an amount of movement by normalizing the first amount and the second amount; and
    outputting the determined amount of movement.

2. The method according to claim 1, wherein
    the first weighting processing is processing in which a first weight is calculated in accordance with the number of points included in the first set of points, and the first amount is multiplied by the first weight
    the second weighting processing is processing in which a second weight is calculated in accordance with the number of points included in the second set of points, and the second amount is multiplied by the second weight.

3. The method according to claim 2, wherein
    the first weighting processing is processing in which the first weight is increased as the number of points included in the first set increases and the first weight is decreased as the number of points included in the first set decreases.

4. The method according to claim 3, wherein
    the first weighting processing is processing in which the first amount is normalized by using a sum total of the first weight and the second weight.

5. The method according to claim 4 further comprising:
    changing the first weight that is less than a first threshold to zero.

6. The method according to claim 5 further comprising:
    calculating the first threshold using a frequency distribution of the first weight and the second weight.

7. The method according to claim 4 further comprising:
    changing the first weight that is greater than a second threshold to the second threshold.

8. The method according to claim 7 further comprising:
    calculating the second threshold using a frequency distribution of the first weight and the second weight.

9. A non-transitory computer-readable storage medium storing a program that causes an information processing apparatus to execute a process, the process comprising:
    extracting a first feature point and a second feature point from a first image of an image-capture target;
    acquiring a first set of points having a correlation with the first feature point and a second set of points having a correlation with the second feature point from a second image being captured after the first image, the correlation meeting a first condition;
    identifying a first position of a center of gravity of the first set and a second position of a center of gravity of the second set;
    determining a first amount of movement of the image-capture target by performing first weighting processing, the first weighting processing being performed based on a number of points included in the first set and an amount of displacement from a position of the first feature point to the first position;
    determining a second amount of movement of the image-capture target by performing second weighting processing, the second weighting processing being performed based on a number of points included in the second set and an amount of displacement from a position of the second feature point to the second position;
    determining an amount of movement by normalizing the first amount and the second amount; and
    outputting the determined amount of movement.

10. The non-transitory computer-readable storage medium according to claim 9, wherein
    the first weighting processing is processing in which a first weight is calculated in accordance with the number of points included in the first set of points, and the first amount is multiplied by the first weight.

11. The non-transitory computer-readable storage medium according to claim 10, wherein
    the first weighting processing is processing in which the first weight is increased as the number of points included in the first set increases and the weight is decreased as the number of points included in the first set decreases.

12. The non-transitory computer-readable storage medium according to claim 10, wherein
    the weighting processing is processing in which the weight of each of the plurality of the first feature point and the second feature point is normalized by using a sum total of the weights calculated for the first feature point and the second feature point, and the first amount and the second amount is multiplied by the normalized weight.

13. The non-transitory computer-readable storage medium according to claim 12, the process further comprising:
    changing the weight that is less than a first threshold to zero.

14. The non-transitory computer-readable storage medium according to claim 13, the process further comprising:
    calculating the first threshold using a frequency distribution of the first weight and the second weight.

15. The non-transitory computer-readable storage medium according to claim 12, the process further comprising:
    changing the first weight that is greater than a second threshold to the second threshold.

16. The non-transitory computer-readable storage medium according to claim 15, the process further comprising:

calculating the second threshold using a frequency distribution of the first weight and the second weight.

17. An information processing apparatus comprising:
a memory; and
a processor coupled to the memory and configured to:
extract a first feature point and a second feature point from a first image of an image-capture target;
acquire a first set of points having a correlation with the first feature point and a second set of points having a correlation with the second feature point from a second image being captured after the first image, the correlation meeting a first condition;
identify a first position of a center of gravity of the first set and a second position of a center of gravity of the second set;
determine a first amount of movement of the image-capture target by performing first weighting processing, the first weighting processing being performed based on a number of points included in the first set and an amount of displacement from a position of the first feature point to the first position;
determine a second amount of movement of the image-capture target by performing second weighting processing, the second weighting processing being performed based on a number of points included in the second set and an amount of displacement from a position of the second feature point to the second position;
determine an amount of movement by normalizing the first amount and the second amount; and
output the determined amount of movement.

18. The information processing apparatus according to claim 17, wherein
the first weighting processing is processing in which a first weight is calculated in accordance with the number of points included in the first set of points, and the first amount is multiplied by the first weight.

19. The information processing apparatus according to claim 18, wherein
the first weighting processing is processing in which the first weight is increased as the number of points included in the first set increases and the first weight is decreased as the number of points included in the first set decreases.

20. The information processing apparatus according to claim 19, wherein
the first weighting processing is processing in which the first amount is normalized by using a sum total of the first weight and the second weight.

* * * * *